US012726809B2

(12) United States Patent
Chaugule et al.

(10) Patent No.: US 12,726,809 B2
(45) **Date of Patent: *Sep. 1, 2026**

(54) CELLULAR WIRELESS SERVICE PLAN TRANSFER BETWEEN NON-LINKED WIRELESS DEVICES

(71) Applicant: Apple Inc., Cupertino, CA (US)

(72) Inventors: Raj S. Chaugule, Santa Clara, CA (US); Bob Bradley, San Jose, CA (US); Can Xiong, San Jose, CA (US); Li Li, Los Altos, CA (US); Najeeb M. Abdulrahiman, Fremont, CA (US); Zexing Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 18/330,338

(22) Filed: Jun. 6, 2023

(65) Prior Publication Data

US 2023/0413035 A1 Dec. 21, 2023

Related U.S. Application Data

(60) Provisional application No. 63/366,616, filed on Jun. 17, 2022.

(51) Int. Cl.
*H04W 8/20* (2009.01)
*H04W 8/18* (2009.01)
(Continued)

(52) U.S. Cl.
CPC ........... *H04W 8/205* (2013.01); *H04W 8/183* (2013.01); *H04W 12/069* (2021.01); (Continued)

(58) Field of Classification Search
CPC ..... H04W 12/06; H04W 8/205; H04W 76/10; H04W 12/30; H04W 12/35; H04W 8/183; H04W 12/50; H04W 12/069
See application file for complete search history.

(56) References Cited

U.S. PATENT DOCUMENTS 10,687,204 B1 * 6/2020 Roy ........................ G06F 21/73
2016/0164883 A1 * 6/2016 Li ........................ H04W 8/205
726/7
(Continued)

FOREIGN PATENT DOCUMENTS

DE 102019129631 B4 * 11/2024 ............ G06Q 50/40

OTHER PUBLICATIONS

U.S. Appl. No. 18/333,476, Non-Final Office Action dated May 6, 2026.

*Primary Examiner* — Margaret G Webb
(74) *Attorney, Agent, or Firm* — DICKINSON WRIGHT RLLP

(57) ABSTRACT

This application sets forth techniques for transfer of a cellular wireless service plan associated with a SIM or an eSIM between non-linked wireless devices. A target wireless device broadcasts an advertisement beacon requesting transfer of a cellular wireless service plan. After successful authentication with a source wireless device, using a manually entered verification code or a QR verification code, the target wireless device selects a cellular wireless service plan to transfer. The source wireless device obtains a transfer token from an MNO entitlement server for transfer of the selected cellular wireless service plan and provides the transfer token to the target wireless device via a secure, short distance Bluetooth connection or, alternatively, embedded in an encrypted QR code. The target wireless device uses the transfer token to obtain a new eSIM associated with transfer of the cellular wireless service plan.

20 Claims, 18 Drawing Sheets

(51) Int. Cl.
*H04W 12/069* (2021.01)
*H04W 12/30* (2021.01)
*H04W 12/50* (2021.01)
*H04W 76/10* (2018.01)

(52) U.S. Cl.
CPC ........... *H04W 12/30* (2021.01); *H04W 12/50* (2021.01); *H04W 76/10* (2018.02)

(56) References Cited

U.S. PATENT DOCUMENTS

| | | | | |
|---|---|---|---|---|
| 2017/0078880 | A1* | 3/2017 | Likar | H04W 8/005 |
| 2020/0120179 | A1* | 4/2020 | Kothapalli Venkata | H04W 12/08 |
| 2020/0389531 | A1* | 12/2020 | Lee | H04L 67/52 |
| 2020/0404501 | A1* | 12/2020 | Kang | H04W 8/183 |
| 2021/0076204 | A1* | 3/2021 | Goyal | H04L 67/306 |
| 2022/0201597 | A1* | 6/2022 | Kim | H04L 9/3213 |
| 2022/0386119 | A1* | 12/2022 | Shen | H04W 12/06 |
| 2023/0030914 | A1* | 2/2023 | Jung | H04W 8/205 |
| 2023/0388217 | A1 | 11/2023 | Hayes | |
| 2024/0349032 | A1* | 10/2024 | Perarnau | H04W 8/183 |

* cited by examiner

EXEMPLARY EXISTING CELLULAR WIRELESS SERVICE PLAN TRANSFER MECHANISMS

SIM/eSIM CELLULAR WIRELESS SERVICE PLAN TRANSFER BETWEEN NON-LINKED DEVICES

340

SIM/eSIM Cellular Wireless Service Plan Transfer Between Proximate Non-Linked Devices

360

SIM/eSIM Cellular Wireless Service Plan Transfer Between Proximate or Distant Non-Linked Devices

BLE ADVERTISEMENT BEACON

500

BLE Advertisement Beacon Protocol Data Unit (PDU)

| PDU Type 4 bits | Reserved 2 bits | Tx Addr Type 1 bit | Rx Addr Type 1 bit | Length 6 bits | Reserved 2 bits | Payload Up to 32 bytes |
|---|---|---|---|---|---|---|

Includes Action Type Field Indicating SIM Transfer Action

520

Targeted Advertisement With Source Device Identifer

SIM/eSIM CELLULAR WIRELESS SERVICE PLAN TRANSFER PROXIMITY RE-TRIGGERING WITH LIMITED RETRY ATTEMPTS

SIM TRANSFER PROXIMITY RE-TRIGGERING WITH DISCONTINUOUS RECEPTION DETECTION

SIM/eSIM CELLULAR WIRELESS SERVICE PLAN TRANSFER AUTHENTICATION

CELLULAR WIRELESS SERVICE PLAN TRANSFER BETWEEN NON-LINKED WIRELESS DEVICES

CROSS-REFERENCE TO RELATED APPLICATIONS

The present application claims the benefit of U.S. Provisional Application No. 63/366,616, entitled "CELLULAR WIRELESS SERVICE PLAN TRANSFER BETWEEN NON-LINKED WIRELESS DEVICES," filed Jun. 17, 2022, the content of which is incorporated by reference herein in its entirety for all purposes.

FIELD

The described embodiments set forth techniques for transfer of a cellular wireless service plan associated with a subscriber identity module (SIM) or an electronic SIM (eSIM) between non-linked wireless devices.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Present mechanisms to transfer a cellular wireless service plan between wireless devices include i) physical transfer of a UICC (SIM card) from a source device to a target device and ii) and electronic transfer of a SIM or an eSIM of a source device to an eSIM on an eUICC of a target device via an MNO entitlement server and an MNO provisioning server where the source device and the target device are linked to a common user account, such as a cloud network service account. There exists a need for mechanisms to transfer a cellular wireless service plan associated with a SIM or eSIM between non-linked wireless devices that are not associated with a common user account.

SUMMARY

This application sets forth techniques for transfer of a cellular wireless service plan associated with a subscriber identity module (SIM) or an electronic SIM (eSIM) between non-linked wireless devices. In some embodiments, a target wireless device that seeks to initiate transfer of a cellular wireless service plan from a source wireless device transmits a wireless personal area network (WPAN), e.g., Bluetooth®, advertisement beacon that includes a specific action flag designated for transfer of a cellular wireless service plan, e.g., a SIM Transfer flag, in a header of the advertisement beacon. The source wireless device scans for Bluetooth advertisement beacons and discovers a nearby target wireless device based on receipt of an advertisement beacon that includes the action flag for transfer of a cellular wireless service plan indicating a request to initiate a cellular wireless service plan transfer session. In some embodiments, the source wireless device requires a received signal strength of the advertisement beacon satisfies a pre-configured signal strength threshold value in order to recognize the target wireless device. In some embodiments, the target wireless device obtains a unique device identifier for the source wireless device via an out-of-band communication channel and includes the unique device identifier in the Bluetooth advertisement beacon, where the source wireless device responds only to a Bluetooth advertisement beacon that includes the unique device identifier of the source wireless device. A notification message (proximity card) can be displayed at the source wireless device indicating that the target wireless device seeks to transfer a cellular wireless service plan associated with a SIM or eSIM from the source wireless device to the target wireless device. Authentication, using a manually entered verification code or by scanning a quick response (QR) code, can be required before establishing a secure connection between the source wireless device and the target wireless device to transfer a cellular wireless service plan. The target wireless device displays an alphanumeric (or numeric only) verification code, and the source wireless device displays a user interface for entry of the verification code to authenticate the target wireless device with the source wireless device. The verification code entered at the source wireless device is sent device to the target wireless device via Bluetooth for verification. When the verification code entered at the source device matches the verification code displayed at the target wireless device, authentication is satisfied, and a secure Bluetooth connection can be established between the source wireless device and the target wireless device. In some embodiments, authentication is alternatively accomplished by displaying a QR code on the target wireless device and scanning the QR code with the source wireless device to provide authentication and allow the secure Bluetooth connection to be established. In some embodiments, an authentication code type is provided by the target wireless device to the source wireless device during a Bluetooth pairing handshake procedure, the authentication code type indicating whether a manually entered verification code or a QR code scan is required for authentication.

After authentication and establishment of a secure Bluetooth connection, the source wireless device provides to the target wireless device a list of cellular wireless service plans available on the source wireless device. A user selects at the target wireless device a cellular wireless service plan associated with a SIM or eSIM on the source wireless device to transfer to the target wireless device. The source wireless device obtains from a mobile network operator (MNO) entitlement server a transfer token for the selected SIM or eSIM cellular wireless service plan and provides the transfer token to the target wireless device via the secure Bluetooth connection. The target wireless device presents the transfer token to the MNO entitlement server with a request to transfer the SIM or eSIM cellular wireless service plan to the target wireless device. After transfer of the SIM or eSIM cellular wireless service plan completes, the Bluetooth connection is closed. In some embodiments, the source wireless device limits display of notification messages (proximity cards) for repeatedly received Bluetooth advertisement beacons.

In some embodiments, a QR code transfer mechanism is used instead of the secure Bluetooth connection mechanism to transfer a cellular wireless service plan from a source wireless device to a target wireless device. In some embodiments, the source wireless device embeds metadata into a QR code for transfer of a cellular wireless service plan associated with a SIM or eSIM on the source wireless device to a target wireless device, and the target wireless device scans the QR code to obtain the metadata for transfer of the SIM or eSIM cellular wireless service. The metadata can include a transfer token obtained from the MNO entitlement server with additional information that specifies the SIM or eSIM cellular wireless service plan to be transferred. In some embodiments, the QR code is encrypted by the source wireless device with a limited time PIN code, and entry of the PIN code on the target wireless device is required to decrypt the scanned QR code.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
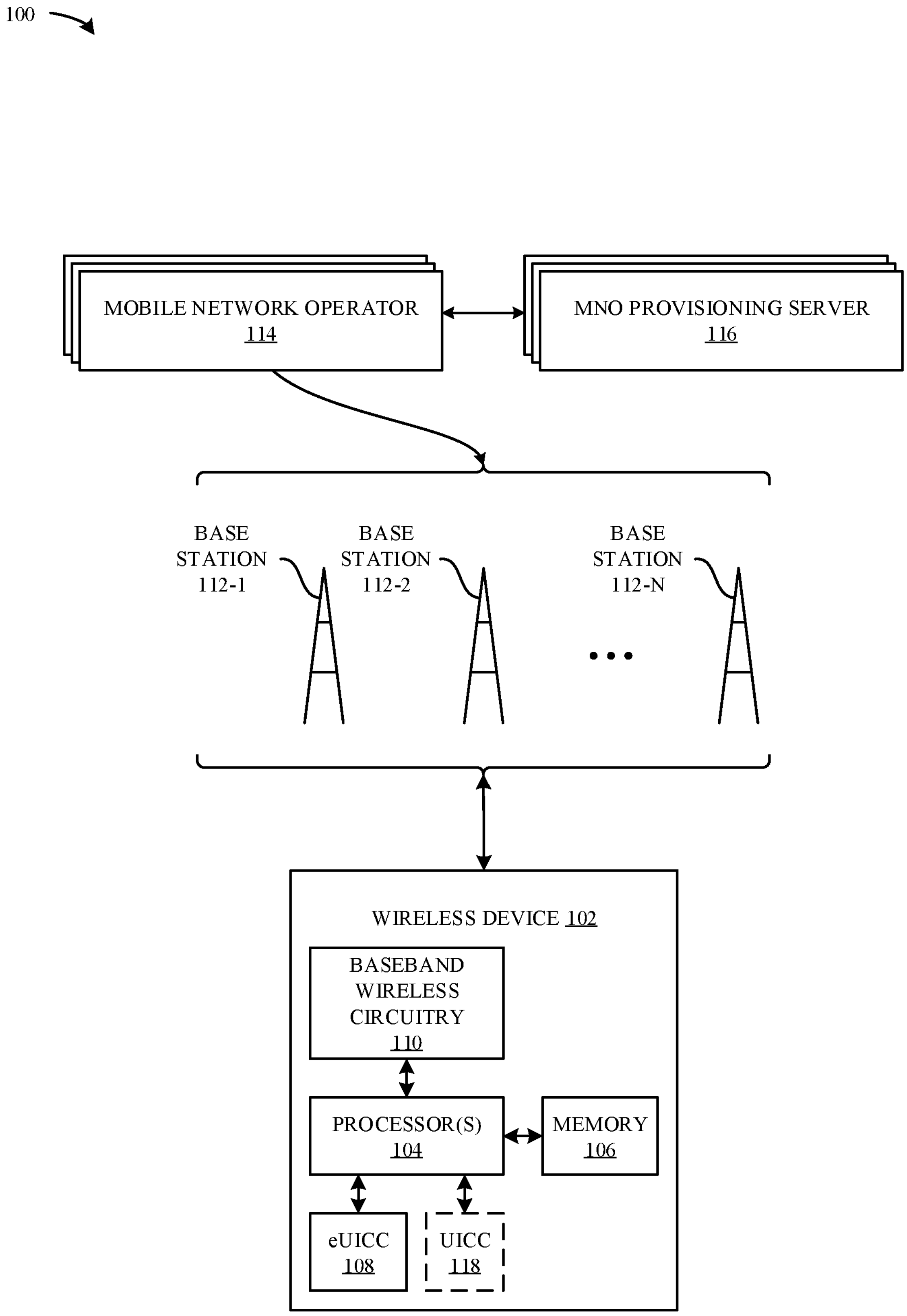
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application sets forth techniques for transfer of a cellular wireless service plan associated with a subscriber identity module (SIM) or an electronic SIM (eSIM) between non-linked wireless devices. A target wireless device that seeks to transfer a cellular wireless service plan from a source wireless device transmits a wireless personal area network (WPAN), e.g., Bluetooth®, advertisement beacon that includes a specific action flag designated for transfer of a cellular wireless service plan, e.g., a SIM Transfer flag, in a header of the advertisement beacon. The source wireless device can periodically scan for Bluetooth advertisement beacons, including while in a Bluetooth Low Energy (BLE) mode, and can discover a nearby target wireless device based on receipt of a Bluetooth advertisement beacon that indicates a request to initiate a cellular wireless service plan transfer session between the source wireless device and the target wireless device. In some embodiments, the source wireless device can require a signal strength, e.g., a received signal strength indication (RRSI) value, of a received Bluetooth advertisement beacon satisfy a pre-configured signal strength threshold for the source wireless device to recognize the target wireless device. A pre-configured signal strength threshold value can be set to ensure the target wireless device and the source wireless device are within a threshold distance of each other. In some embodiments, the source wireless device is required to be in a particular state in order to respond to the received Bluetooth advertisement beacon, e.g., in an unlocked state and/or with a display in an "on" state. In some embodiments, the target wireless device can obtain a unique device identifier for the source wireless device via an out-of-band communication channel (i.e., via a communication channel other than the local WPAN Bluetooth channel) and include the unique device identifier in the Bluetooth advertisement beacon. In some embodiments, a source wireless device responds only to a Bluetooth advertisement beacon that includes the unique device identifier of the source wireless device. A notification message (proximity card) can be displayed at the source wireless device indicating the target wireless device seeks to transfer a cellular wireless service plan from the source wireless device to the target wireless device. In some embodiments, user consent at the source wireless device can be required for transfer of the cellular wireless service plan to proceed.

An authentication phase follows initial discovery of the target wireless device by the source wireless device. Authentication, using a manually entered verification code or by scanning a quick response (QR) code, can be required before establishing a secure connection between the source wireless device and the target wireless device to transfer a cellular wireless service plan. The target wireless device displays an alphanumeric (or numeric only) verification code, and the source wireless device displays a user interface for entry of the verification code shown on the target wireless device. The entered verification code is sent from the source wireless device to the target wireless device via Bluetooth for verification. When authentication using the verification code is satisfied, a secure Bluetooth connection can be established between the source wireless device and the target wireless device. In some embodiments, a QR code is displayed on the target wireless device and scanned by the source wireless device to provide authentication and allow the secure Bluetooth connection to be established between the source wireless device and the target wireless device. In some embodiments, the target wireless device provides an authentication code type to the source wireless device during a Bluetooth pairing handshake procedure, where the authentication code type indicates whether a manually entered numeric or alphanumeric verification code or a scanned QR code is required for authentication.

After successful authentication and establishment of the secure Bluetooth connection, the source wireless device provides to the target wireless device a list of cellular wireless service plans available on the source wireless device. The list can include details for each cellular wireless service plan including an indication of transferability. A user of the target wireless device can select a cellular wireless service plan, associated with a SIM (on a UICC) or an eSIM (on an eUICC) of the source wireless device, to transfer from the source wireless device to the target wireless device. The source wireless device obtains from a mobile network operator (MNO) entitlement server a transfer token for a selected SIM or eSIM cellular wireless service plan and provides the transfer token to the target wireless device via the secure Bluetooth connection. The target wireless device presents the transfer token to an MNO entitlement server with a request to transfer the SIM or eSIM cellular wireless service plan to the target wireless device. The transfer token can indicate authority of the target wireless device to transfer the SIM or eSIM cellular wireless service plan from the source wireless device. After transfer of the SIM or eSIM cellular wireless service plan completes, the Bluetooth connection between the target wireless device and the source wireless device is closed.

In some embodiments, the advertisement beacons, broadcast by the target wireless device, include a sequence number, which can increment (or change) for distinct cellular wireless service plan transfer sessions. In some embodiments, the source wireless device ignores received Bluetooth advertisement beacons that include a previously used (or most recently used) sequence number. In some embodiments, the source wireless device suppresses displaying repeated notifications (proximity cards) for Bluetooth advertisement beacons indicating a SIM Transfer action type, when received from a target wireless device during a continuous reception time window after a first Bluetooth advertisement beacon received during the continuous reception time window. In some embodiments, the source wireless device detects a quiescent time period between continuous reception time windows that satisfies a pre-configured time threshold and re-allows displaying notification messages (proximity cards) for a Bluetooth advertisement beacon newly received from the target wireless device. In some embodiments, the advertisement beacons broadcast by the target wireless device include a device type indicating a particular device type for the target wireless device, and the source wireless device ignores the Bluetooth advertisement beacon when the particular device type value for the target wireless device does not match to a corresponding particular device type value for the source wireless device.

In some embodiments, the source wireless device embeds metadata for transfer of the SIM or eSIM cellular wireless service plan to the target wireless device into a QR code provided to the target wireless device. The target wireless device scans the QR code to obtain the metadata for transfer of the SIM or eSIM cellular wireless service plan. The metadata can include a transfer token obtained from an MNO entitlement server with additional information that specifies the SIM or eSIM cellular wireless service plan to be transferred. Exemplary additional information includes one or more of: a mobile subscriber integrated services digital network (MSISDN) value (also referred to as a phone number), MNO identifiers, one or more MNO server network addresses or universal resource locator (URL) values or fully qualified domain name (FQDN) value, an international mobile subscriber identity (IMSI) value, an international mobile equipment identity (IMEI) value, a timestamp of validity, or encryption format details. In some embodiments, the QR code is encrypted by the source wireless device with a one-time-use, limited time PIN code, and entry of the PIN code on the target wireless device is required to decrypt the scanned QR code. In some embodiments, confirmation of user intent for transfer of a cellular wireless service plan, such as via a secure intent mechanism that can include processing by a secure enclave processor (SEP) on the target wireless device and/or on the source wireless device, can be required to proceed with transfer of the SIM or eSIM cellular wireless service plan from the source wireless device to the target wireless device.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The wireless device 102 can represent a mobile computing device (e.g., an iPhone®, an iPad®, or an Apple Watch by Apple®), the base stations 112-1 to 112-*n* can represent cellular wireless network entities including evolved NodeBs (eNodeBs or eNBs) and/or next generation NodeBs (gNodeBs or gNB) that are configured to communicate with the wireless device 102, and the MNOs 114 can represent different wireless service providers that provide specific cellular wireless services (e.g., voice and data) to which the wireless device 102 can subscribe, such as via a subscription account for a user of the wireless device 102.

As shown in FIG. 1, the wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the wireless device 102 is associated. To be able to access services provided by an MNO, an eSIM can be reserved for subsequent download and installation to the eUICC 108. In some embodiments, the eUICC 108 obtains one or more eSIMs from one or more associated MNO provisioning servers 116. The MNO provisioning servers 116 can be maintained by the MNOs 114, an OEM manufacturer, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

Figure 2:
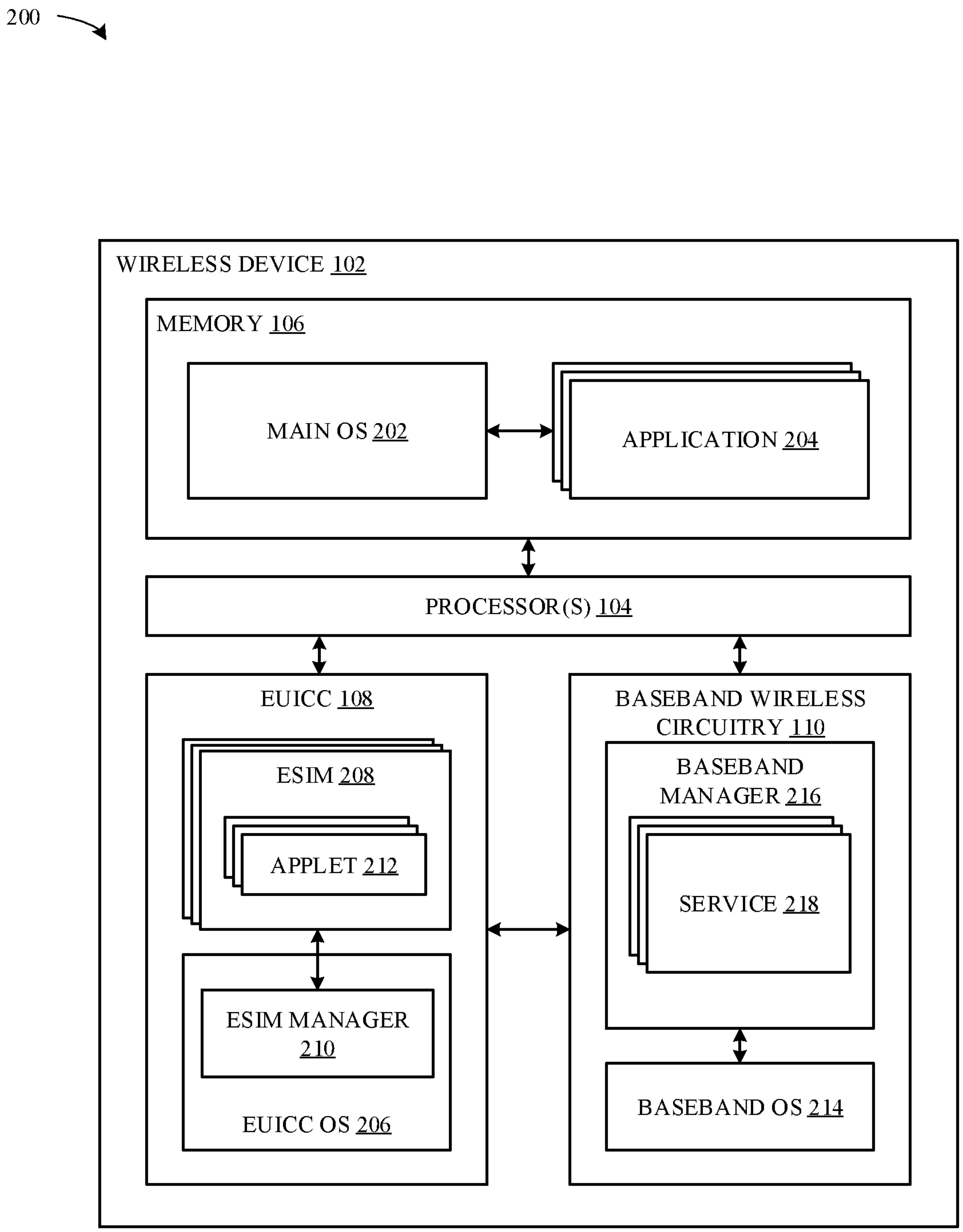
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and to provide baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3A:
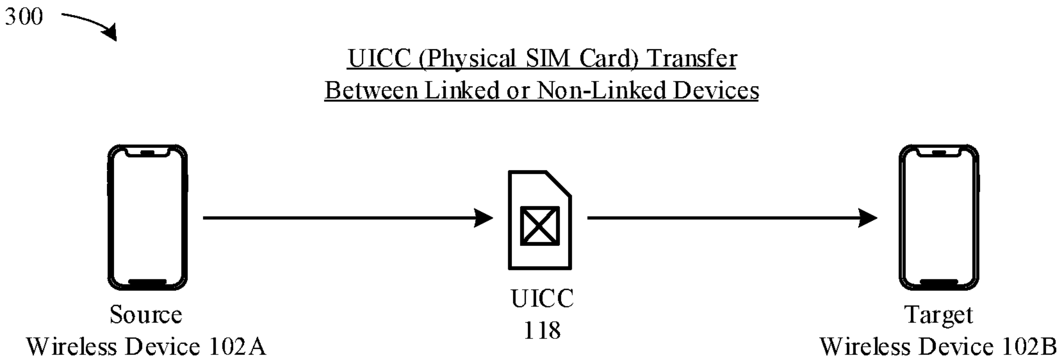
FIG. 3A illustrates block diagrams of exemplary existing cellular service transfer mechanisms for linked wireless devices, according to some embodiments.
Figure 3A:
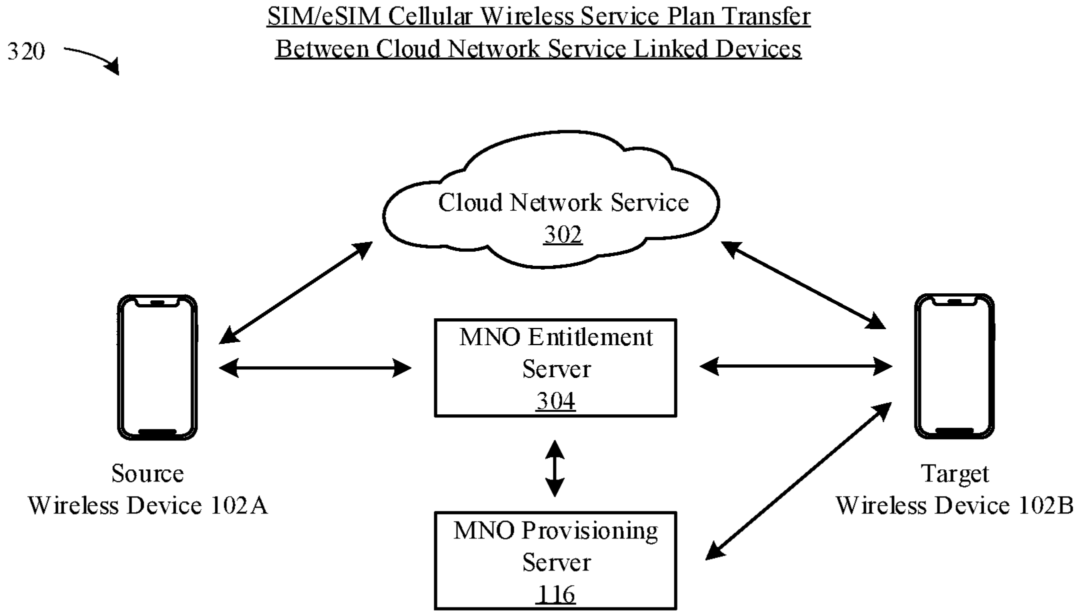

FIG. 3A illustrates diagrams 300, 320 of two exemplary existing mechanisms to transfer a cellular wireless service plan from a source wireless device 102A to a target wireless device 102B. In diagram 300, a cellular wireless service plan is associated with a UICC (SIM card) 118 that includes credentials for access to wireless networks of an MNO 114. When the target wireless device 102B supports hardware and software capabilities required to access wireless networks of an MNO 114 using a SIM in the UICC 118, a user can remove the UICC 118 from the source wireless device 102A and insert the UICC 118 into a receiving bay of the target wireless device 102B. The target wireless device 102B can use credentials included in the SIM of the UICC

118 to authenticate with and camp on a cellular wireless access network associated with the MNO 114 associated with the SIM of the UICC 118. The source wireless device 102A and the target wireless device 102B can belong to distinct users and can be supplied by different original equipment manufacturers (OEMs).

Diagram 320 illustrates an exemplary mechanism to transfer a cellular wireless service plan, associated with i) a SIM on a UICC 118 or ii) an eSIM 208 on an eUICC 108, from a source wireless device 102A to a target wireless device 102B using a cloud network service 302. Unlike the mechanism illustrated in diagram 300, physical transfer of a UICC 118 does not occur, and a new eSIM 208 is provided to an eUICC 108 of the target wireless device 102B as part of the transfer. Each of the source wireless device 102A and the target wireless device 102B can be registered with a common user account, such as managed by a cloud-based service, e.g., an iCloud® service account. The source wireless device 102A and the target wireless device 102B can each sign into the common user account, where sign-in can further require two-factor-authentication (2FA) from each of the source wireless device 102A and the target wireless device 102B. The source wireless device 102A can provide information regarding cellular wireless service plans available on the source wireless device 102A to the cloud network service 302, and the target wireless device 102B can discover available cellular wireless service plans based on the information stored at the cloud network service 302. The source wireless device 102A can obtain from the MNO entitlement server 304 a transfer token required for transfer of a cellular wireless service plan associated with a SIM or eSIM 208 from the source wireless device 102A to the target wireless device 102B and upload the transfer token to the cloud network service 302. The target wireless device 102B can obtain the transfer token from the cloud network service 302 and provide the transfer token to the MNO entitlement server 304 to indicate authority to transfer the cellular wireless service plan from the source wireless device 102A to the target wireless device 102B. The target wireless device 102B can obtain an eSIM 208 from the MNO provisioning server 116, which can be authorized to release the eSIM 208 to the target wireless device 102B based on communication from the MNO entitlement server 304. The target wireless device 102B can download, install, and activate the eSIM 208 on an eUICC 108 of the target wireless device 102B. The transfer mechanism illustrated by the diagram 320 requires, however, that the source wireless device 102A and the target wireless device 102B be linked by a common user account at the cloud network service 302. In some cases, each of the source wireless device 102A and the target wireless device 102B are also required to have a two-factor-authentication (2FA) feature enabled. In some cases, the source wireless device 102A and the target wireless device 102B are required to be manufactured by the same OEM. As described further herein, transfer mechanisms are proposed that do not require a common cloud service account, allow different cloud service accounts on each wireless device, optionally require 2FA, and allow for transfer between wireless devices manufactured by different OEMs.

Figure 3B:
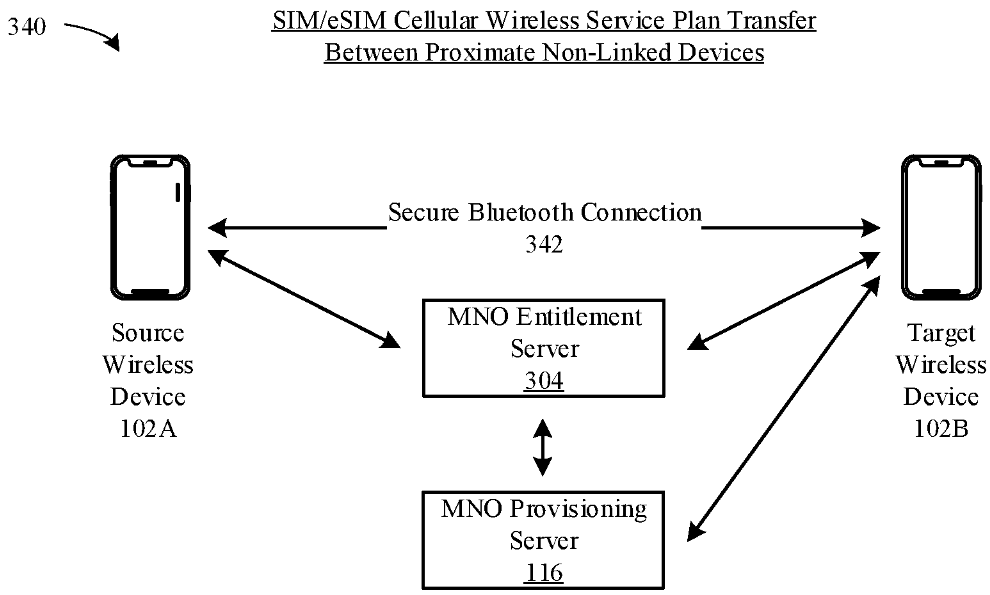
FIG. 3B illustrates block diagrams of new cellular service transfer mechanisms for non-linked wireless devices, according to some embodiments.
Figure 3B:
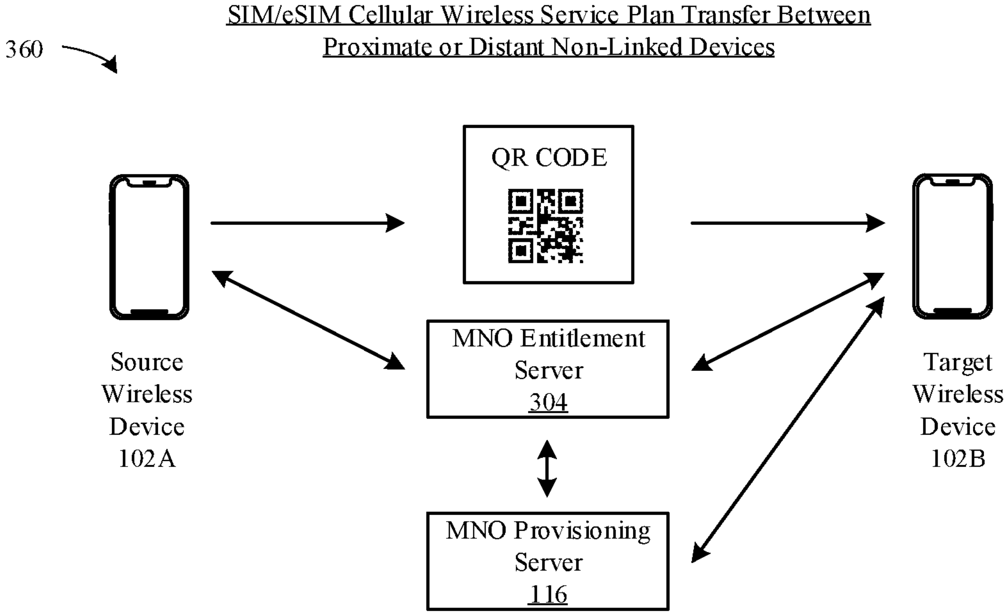

FIG. 3B illustrates diagrams 340, 360 of exemplary mechanisms to transfer a cellular wireless service plan associated with a SIM or eSIM 208 from a source wireless device 102A to a target wireless device 102B, where the source and target wireless devices 102A, 102B are not required to be linked to a common user account of a cloud network-based service or to be manufactured by a common OEM. As illustrated by diagram 340, the source wireless device 102A and the target wireless device 102B can establish a secure Bluetooth connection 342 between them over which to exchange information required to select and transfer a cellular wireless service plan, associated with a SIM on a UICC 118 or an eSIM 208 on an eUICC 108 of the source wireless device 102A, to a new eSIM 208 downloaded to an eUICC 108 of the target wireless device 102B. In some embodiments, as illustrated in diagram 360, the source wireless device 102A can provide information for transfer of the cellular wireless service plan to the target wireless device 102B using a quick response (QR) code, which can be scanned by the target wireless device 102B. In some embodiments, the source and target wireless devices 102A, 102B are within proximity of each other to allow display of the QR code on the source wireless device 102A and scanning by a camera of the target wireless device 102B. In some embodiments, the source and target wireless devices 102A, 102B are not within proximity of each other, and the source wireless device 102A provides the QR code to the target wireless device 102B via an alternative out-of-band communication channel (not shown), such as via email or via a message service. In either mechanism (secure Bluetooth or QR code), each of the source wireless device 102A and the target wireless device 102B can communicate with an MNO entitlement server 304 to authorize transfer of the cellular wireless service plan from the source wireless device 102A to the target wireless device 102B. The MNO entitlement server 304 can communicate information to the MNO provisioning server 116 to reserve a new eSIM 208 for the transferred cellular wireless service plan. The target wireless device 102B can download the new eSIM 208 from the MNO provisioning server 116 and subsequently install and activate the new eSIM 208 on an eUICC 108 of the target wireless device 102B. In some embodiments, the source and target wireless devices 102A, 102B need to be within a threshold proximity distance of each other in order to establish the secure Bluetooth communication channel. In some embodiments, the source wireless device 102A and the target wireless device 102B can use different operating systems and can be manufactured by different OEMs, e.g., an iOS device manufactured by Apple Inc. and an Android™ device manufactured by Motorola.

Figure 4A:
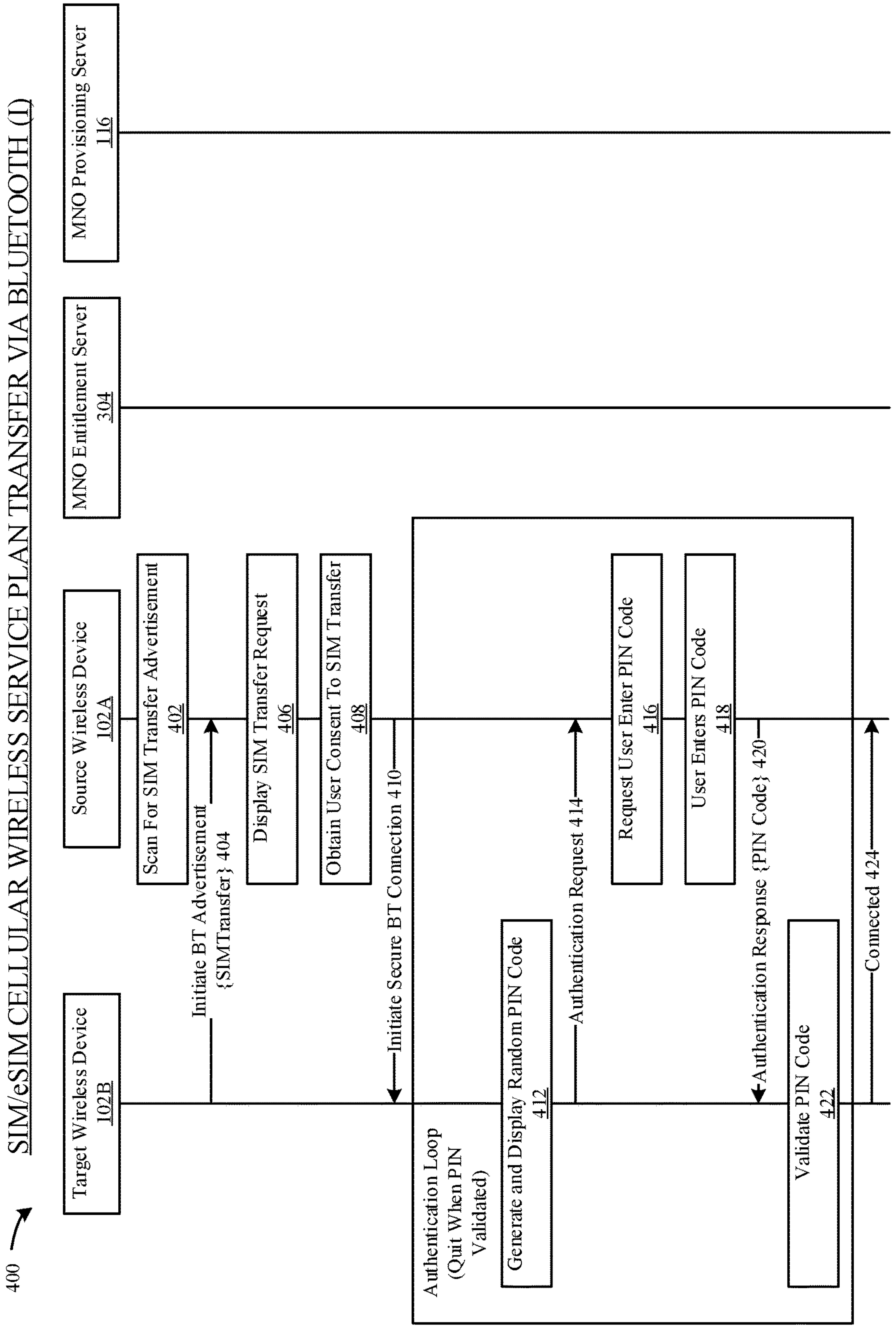
FIGS. 4A and 4B illustrates an exemplary sequence of actions performed to transfer a cellular wireless service plan associated with a SIM or eSIM from a source wireless device to a target wireless device via a secure Bluetooth connection, according to some embodiments.
Figure 4B:
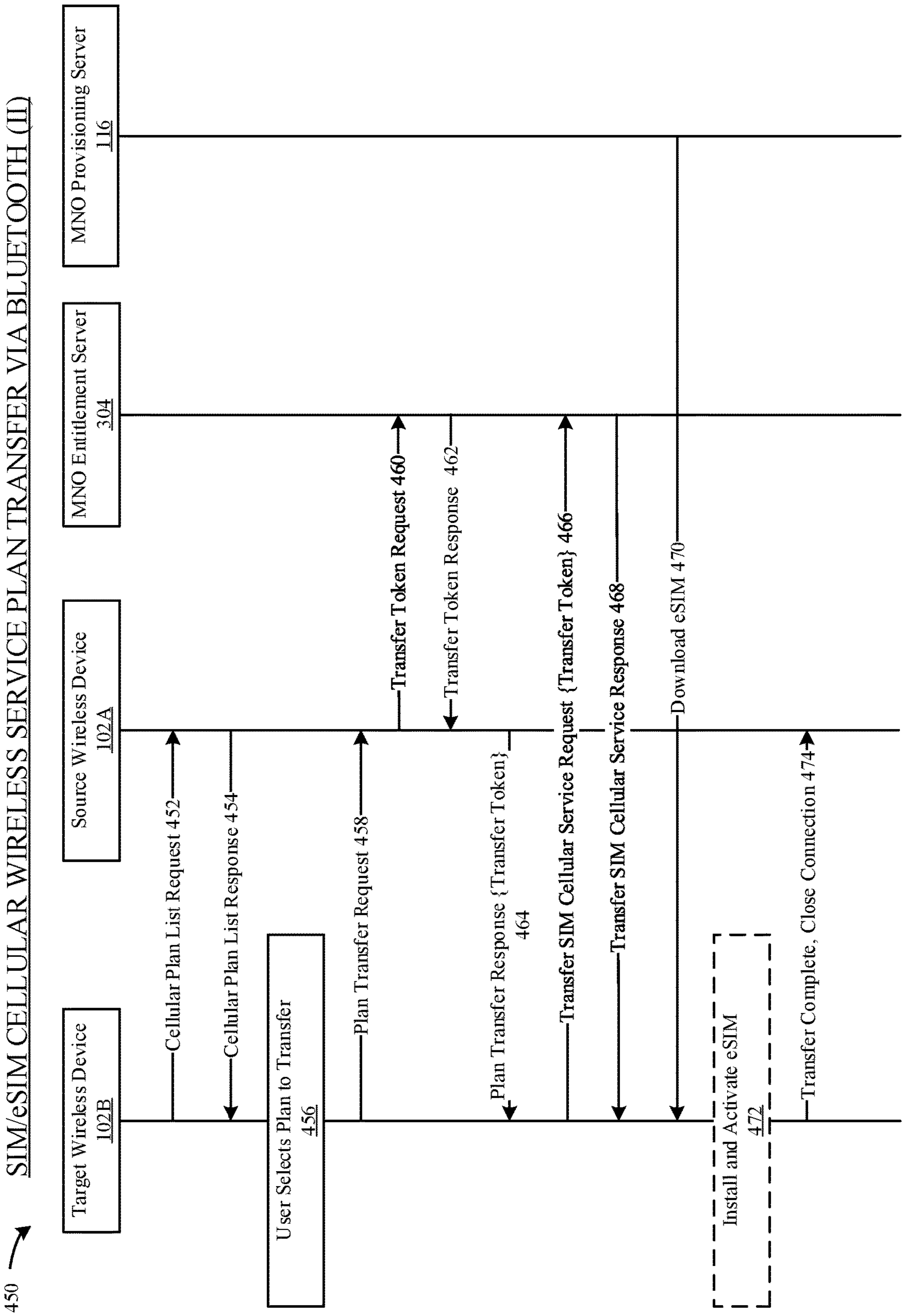

FIGS. 4A and 4B illustrate diagrams 400, 450 of an exemplary sequence of actions performed to transfer a cellular wireless service plan associated with a SIM or an eSIM 208 of a source wireless device 102A to a new eSIM 208 downloaded to a target wireless device 102B, where the transfer includes a secure Bluetooth communication channel established between the source wireless device 102A and the target wireless device 102B. At 402, the source wireless device 102A scans for Bluetooth advertisement beacons, including those that include an indication for transfer of a SIM or eSIM 208. In some embodiments, the source wireless device 102A is in a Bluetooth Low Energy (BLE) scan mode. At 404, the target wireless device 102B initiates broadcasting one or more Bluetooth (BT) advertisement beacons that include an action flag that specifies a SIM/eSIM transfer in the header of the BT advertisement beacon. The source wireless device 102A can discover the target wireless device 102B upon reception of the BT advertisement beacon and can determine that the target wireless device 102B seeks to transfer a cellular wireless service plan, associated with a SIM on a UICC 118 or an eSIM 208 on an eUICC 108 of the source wireless device 102A, based on the inclusion of a SIM Transfer action flag in a header of the BT advertisement beacon. In some embodiments, the source wireless device 102A measures a signal strength of the received BT advertisement beacon, e.g., a received signal strength indication (RSSI) value, and determines whether to proceed with a transfer procedure based on whether the signal strength satisfies a pre-configured signal strength threshold, e.g., RSSI is at least −45 dB. The pre-configured signal strength threshold value can be set to ensure the source wireless device 102A and the target wireless device 102B are within a proximity distance threshold of each other. At 406, the source wireless device 102A presents, via a display of the source wireless device 102A, a proximity notification indicating that the target wireless device 102B requests a cellular wireless service plan transfer. At 408, the source wireless device 102A obtains user consent to proceed with the transfer procedure. When user consent is not obtained, the transfer procedure can end. At 410, after obtaining user consent, the source wireless device 102A sends a message to the target wireless device 102B to initiate establishment of a secure Bluetooth connection with the target wireless device 102B. In some embodiments, to establish the secure Bluetooth connection, a random personal identification number (PIN) code is used to authenticate the source wireless device 102A to the target wireless device 102B. At 412, the target wireless device 102B generates and presents via a display of the target wireless device a random PIN code. The random PIN code may also be referred to as a passcode or a verification code, in some embodiments. At 414, the target wireless device 102B sends, to the source wireless device 102A, an authentication request message. At 416, the source wireless device 102A presents via a display of the source wireless device 102A a screen requesting entry of the PIN code. The PIN code is provided by the target wireless device 102B to a user of the source wireless device 102A via an out-of-band communication channel (not shown), e.g., verbally read or presented visually to the user of the source wireless device 102A. At 418, the user enters a PIN code value via an input/output of the source wireless device 102A. At 420, the source wireless device 102A replies to the authentication request message with an authentication response message that includes the entered PIN code value. At 422, the target wireless device 102B validates that the PIN code value received from the source wireless device 102A matches the random PIN code generated and displayed at 412. When the PIN code is validated, indicating successful authentication, the target wireless device 102B, at 424, completes establishment of the secure Bluetooth communication channel with the source wireless device 102A.

At 452, the target wireless device 102B sends to the source wireless device 102A, via the secure Bluetooth communication channel, a request for a list of cellular wireless service plans available on the source wireless device 102A. At 454, the source wireless device 102A replies to the target wireless device 102B with a response that includes the requested list of cellular wireless service plans. In some embodiments, the list of cellular wireless service plans includes information for each cellular wireless service plan, such as a phone number, a user-designated label, an indication of transferability, etc. At 456, the target wireless device 102B obtains a selection of a cellular wireless service plan to transfer by a user of the target wireless device 102B. At 458, the target wireless device 102B sends to the source wireless device 102A a request to transfer the selected cellular wireless service plan. At 460, the source wireless device 102A sends to an MNO entitlement server 304 a request for a transfer token to be used for transfer of the selected cellular wireless service plan. The MNO entitlement server 304 can validate transfer and communicate with an MNO provisioning server 116 to reserve a new eSIM 208 associated with transfer of the cellular wireless service plan to the target wireless device 102B. At 462, the MNO entitlement server 304 replies to the source wireless device 102A with a response that includes the requested transfer token. At 464, the source wireless device 102A forwards to the target wireless device 102B the transfer token in a plan transfer response message. At 466, the target wireless device 102B presents the transfer token to the MNO entitlement server 304 (which can be the same or another entitlement server 304 associated with the MNO 114), where the transfer token indicates authority for transfer of the cellular wireless service plan to the target wireless device 102B. At 468, after validation of the transfer token, the MNO entitlement server 304 sends a response message authorizing transfer of the cellular wireless service plan to the target wireless device 102B. In some embodiments, the response message indicates a network address, a universal resource locator (URL), and/or a fully qualified domain name (FQDN) value for an MNO provisioning server 116 from which to obtain the new eSIM 208 associated with the transfer of the cellular wireless service plan. At 470, the target wireless device 102B downloads the new eSIM 470 from the MNO provisioning server. In some embodiments, the target wireless device 102B installs the new eSIM 208 on an eUICC 108 of the target wireless device 102B and activates the installed new eSIM 208 for cellular wireless service with the MNO 114. In some embodiments, installation and/or activation of the eSIM 208 can occur after the cellular wireless service plan transfer procedure ends. At 474, the target wireless device 102B, sends a message to the source wireless device 102A indicating that transfer of the cellular wireless service plan has completed, and the secure Bluetooth connection between the source wireless device 102A and the target wireless device 102B is closed. In some embodiments, the secure Bluetooth connection can be dedicated for use only for the cellular wireless service plan transfer session and can be restricted to not be used for other data flows between the source and target wireless devices 102A, 102B.

Figure 4C:
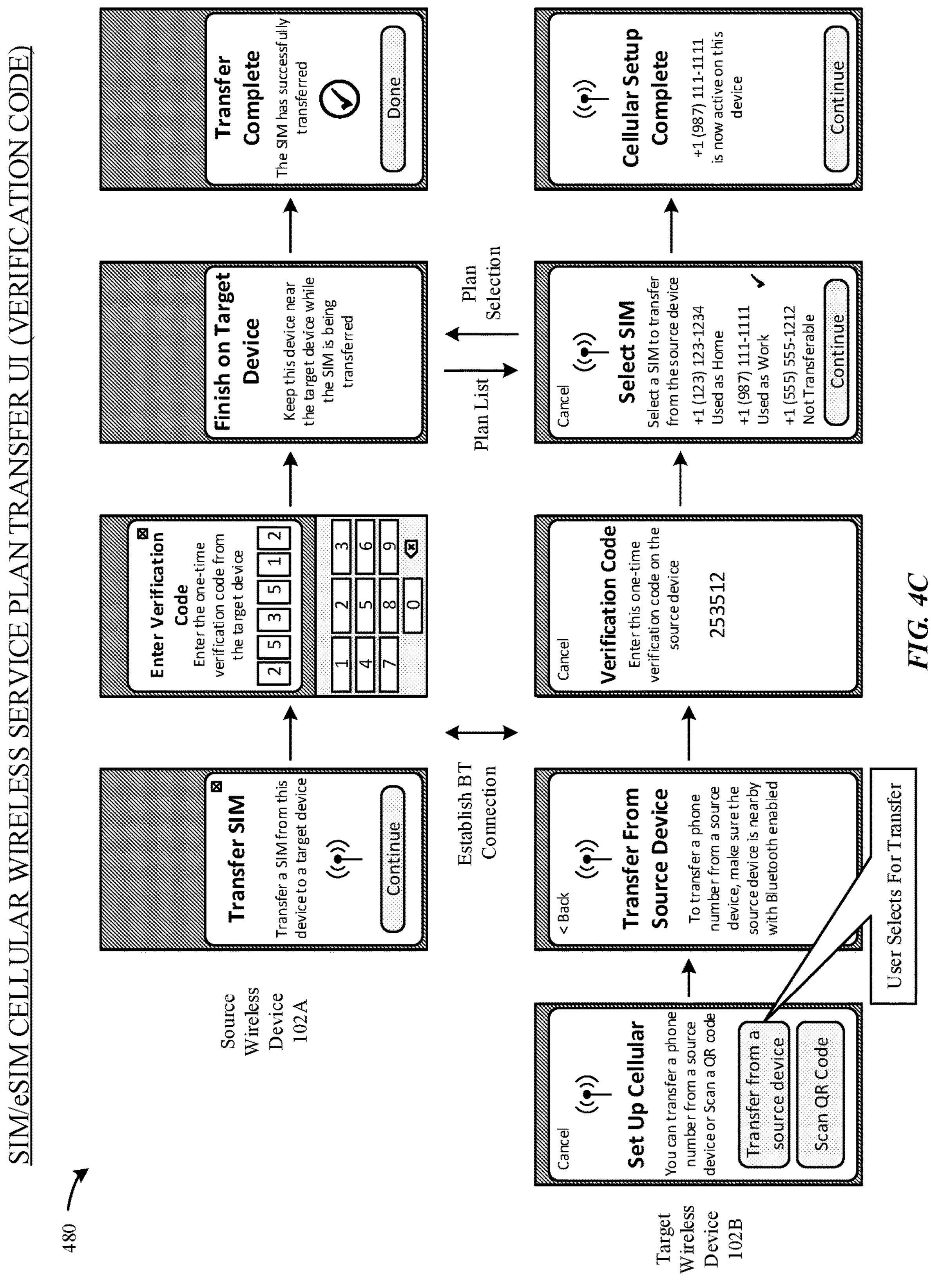
FIG. 4C illustrates exemplary user interface (UI) screens for transfer of a SIM or eSIM cellular wireless service plan from a source wireless device to a target wireless device, according to some embodiments.

FIG. 4C illustrates a diagram 480 of a series of exemplary user interface screens displayed on a source wireless device 102A and on a target wireless device 102B during a cellular wireless service plan transfer procedure. Initially, at the target wireless device 102B, after selecting to set up a cellular wireless service plan, a user of the target wireless device 102B is presented an option to transfer a phone number (by which to identify a cellular wireless service plan for transfer) from a source wireless device 102A or to alternatively scan a QR code. Upon selection of the option to transfer a phone number from a source wireless device 102A, a second UI screen advises the user to ensure the source wireless device 102A is nearby the target wireless device 102B with Bluetooth enabled to allow for a short-range, secure Bluetooth communication channel to be established between the target wireless device 102B and the source wireless device 102A. The source wireless device 102A presents a transfer SIM notification message responsive to receipt of a Bluetooth advertisement beacon from the target wireless device 102B, where the Bluetooth advertisement beacon can include an action flag indicating the requested cellular wireless service plan transfer. The source wireless device 102A can measure the strength of the received Bluetooth advertisement beacon and present the transfer SIM notification message when a received signal strength satisfies a signal strength threshold to ensure the target wireless device 102B and the source wireless device 102A are within a threshold distance of each other. In some embodiments, the source wireless device 102A will not respond to the Bluetooth advertisement beacon when the source wireless device 102A is not protected by a passcode. In some embodiments, the source wireless device 102A will not respond to the Bluetooth advertisement beacon when there are no SIM cards 118 or eSIMs 208 installed in the source wireless device 102A. In some embodiments, the source wireless device 102A will not respond to the Bluetooth advertisement beacon when the display of the source wireless device 102A is in an off state. In some embodiments, entry of a passcode for the source wireless device 102A is required to proceed with the cellular wireless service plan transfer procedure when the display of the source wireless device 102A is in an on and locked state. After approval by the user of the source wireless device 102A to continue with the SIM transfer, the source wireless device 102A presents a screen requiring entry of a one-time use verification code that is displayed on the target wireless device 102B. After successful verification, the source wireless device 102A and the target wireless device 102B can complete establishment of the secure Bluetooth connection. The source wireless device 102A provides to the target wireless device 102B, via the secure Bluetooth connection, a list of cellular wireless service plans available on the source wireless device 102A from which to select a cellular wireless service plan to transfer to the target wireless device 102B. The cellular wireless service plan list can include information for each cellular wireless service plan, such as an associated phone number, a user-designated label, and/or an indication of transferability. A user selection of a cellular wireless service plan is returned to the source wireless device 102A, which can obtain from an MNO entitlement server 304 a transfer token for transfer of the selected cellular wireless service plan. In some embodiments, the source wireless device 102A can communicate the transfer token to the target wireless device 102B via the Bluetooth communication channel. The target wireless device 102B can use the transfer token to obtain a new eSIM 208 reserved for transfer of the cellular wireless service plan to the target wireless device 102B. A successful transfer completion notification can be provided at the source wireless device 102A, and a notification that the cellular wireless service plan has successfully been downloaded, installed, and activated can be presented at the target wireless device 102B. The secure Bluetooth connection is closed after successful transfer of the cellular wireless service plan, as the secure Bluetooth connection is intended only for use for a single transfer session.

Figure 5:
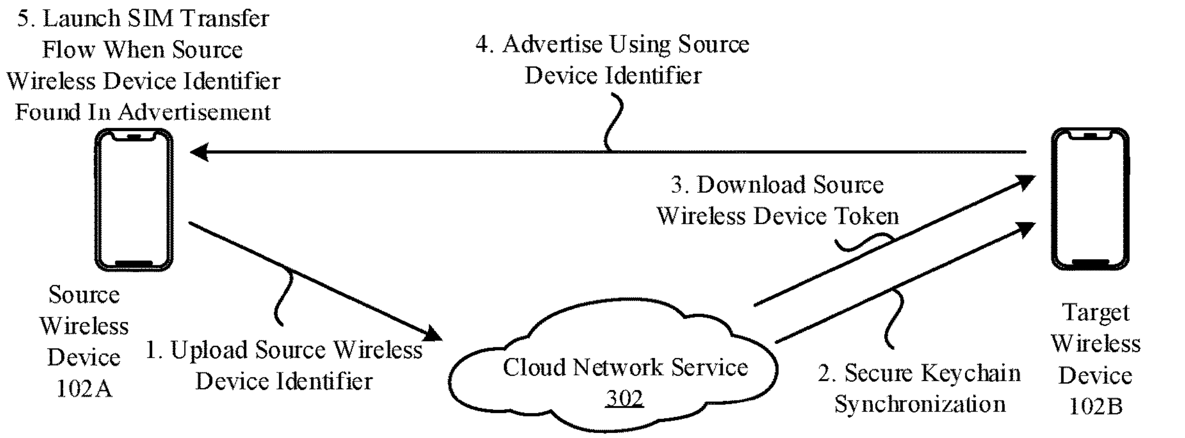
FIG. 5 illustrates diagrams of an exemplary Bluetooth Low Energy (BLE) advertisement beacon and an example of targeted advertisement to a source wireless device, according to some embodiments.

The cellular wireless service plan transfer process is initiated between the target wireless device 102B and the source wireless device 102A based on a Bluetooth advertisement beacon that includes a SIM transfer action type included in the payload of a Bluetooth advertising channel protocol data unit (PDU). FIG. 5 illustrates a diagram 500 of a format for a BLE advertisement PDU, where the SIM transfer action type is included in an action type field of the payload. The target wireless device 102B advertises to wireless devices within a proximate area that the target wireless device 102B seeks to establish a connection to transfer a cellular wireless service plan. When the BLE advertisement PDU does not include targeting to a particular source wireless device 102A, multiple source wireless devices 102A within a proximate distance of the target wireless device 102B can display a transfer SIM notification message. A user of a source wireless device 102A can dismiss the transfer SIM notification and not proceed further, if desired. A Bluetooth connection will only be established after user acceptance at the source wireless device 102A to continue with the cellular wireless service plan transfer process and after successful authentication, such as using a verification code or a QR code for verification as described herein.

To limit display of transfer SIM notification messages to a particular source wireless device 102A, the BLE advertisement PDU can include an identifier for the particular source wireless device 102A as illustrated in the diagram 520 of FIG. 5. In some embodiments, a device identifier for a source wireless device 102A is communicated to the target wireless device 102B via an out-of-band communication channel, such as via a cloud network service 302. The source wireless device 102A can upload a unique device identifier for the source wireless device 102A to the cloud network service 302, and the target wireless device 102B can obtain the unique device identifier for the source wireless device 102A from the cloud network service 302. In some embodiments, the target wireless device 102B synchronizes with the cloud network service 302 using a security and authentication feature, such as via iCloud Keychain®, and downloads from the cloud network service 302 a source wireless device token that provides a unique device identifier for the source wireless device 102A that can be included in the BLE advertisement beacon. A source wireless device 102A within a proximity distance of the target wireless device 102B can scan for BLE advertisement beacons and apply filter logic to respond only to a BLE advertisement beacon PDU that includes a unique device identifier associated with the source wireless device 102A. In some embodiments, the unique device identifier is a hardware identifier or a software identifier associated with the source wireless device 102A. In some embodiments, the unique device identifier is a phone number associated with a cellular wireless service plan on the source wireless device 102A.

Figure 6A:
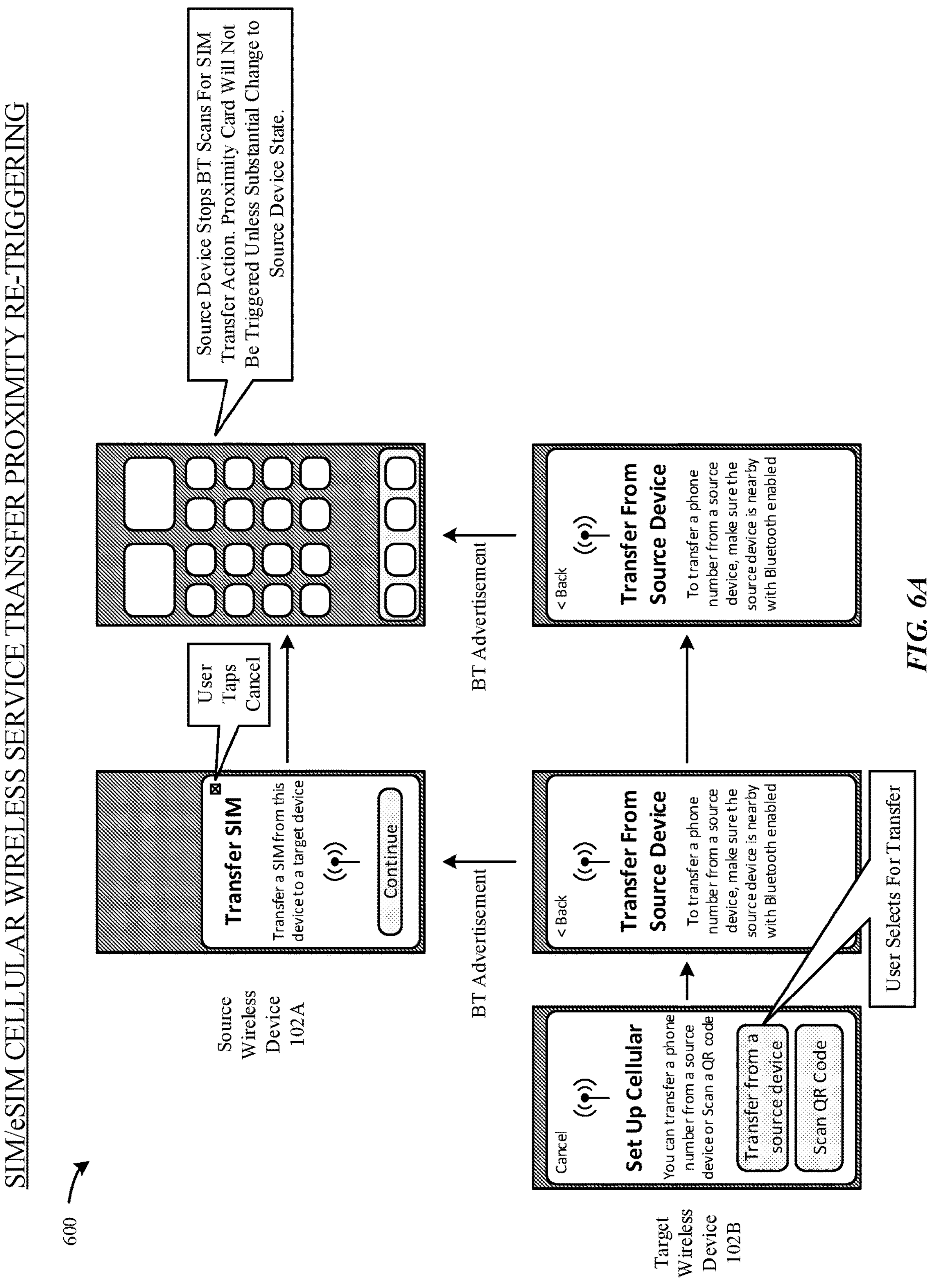
FIG. 6A illustrates a diagram of an example of SIM/eSIM transfer proximity re-triggering, according to some embodiments.

FIG. 6A illustrates a diagram 600 with limiting re-triggering of SIM transfer notifications at a source wireless device 102A. A target wireless device 102B transmits BLE advertisement beacons, which in some cases can be targeted to a particular source wireless device 102A. The source wireless device 102A presents a Transfer SIM notification message indicating a request to transfer a SIM/eSIM cellular wireless service plan from the source wireless device 102A to the target wireless device 102B. A user of the source wireless device 102A can cancel the Transfer SIM notification message to indicate to not continue with the cellular wireless service plan transfer process. Cancellation can be purposefully or unintentionally entered. The source wireless device 102A can be configured to stop scanning for (or stop processing of) Bluetooth advertisement beacons that include the SIM Transfer action type for at least a quiescent time period and/or until a substantial state change at the source wireless device 102A occurs. A Transfer SIM notification message (proximity card) will not be displayed at a source wireless device 102A until the quiescent time period elapses and/or the state of the source wireless device 102A changes substantially, such as from an off display state to an on display state or from a locked state to an unlocked state. Suppression of re-triggered notification messages for transfer of a SIM/eSIM cellular wireless service plan can avoid alerting a user of the source wireless device 102A to reduce annoying interruptions by persistent requests from a target wireless device 102B.

Figure 6B:
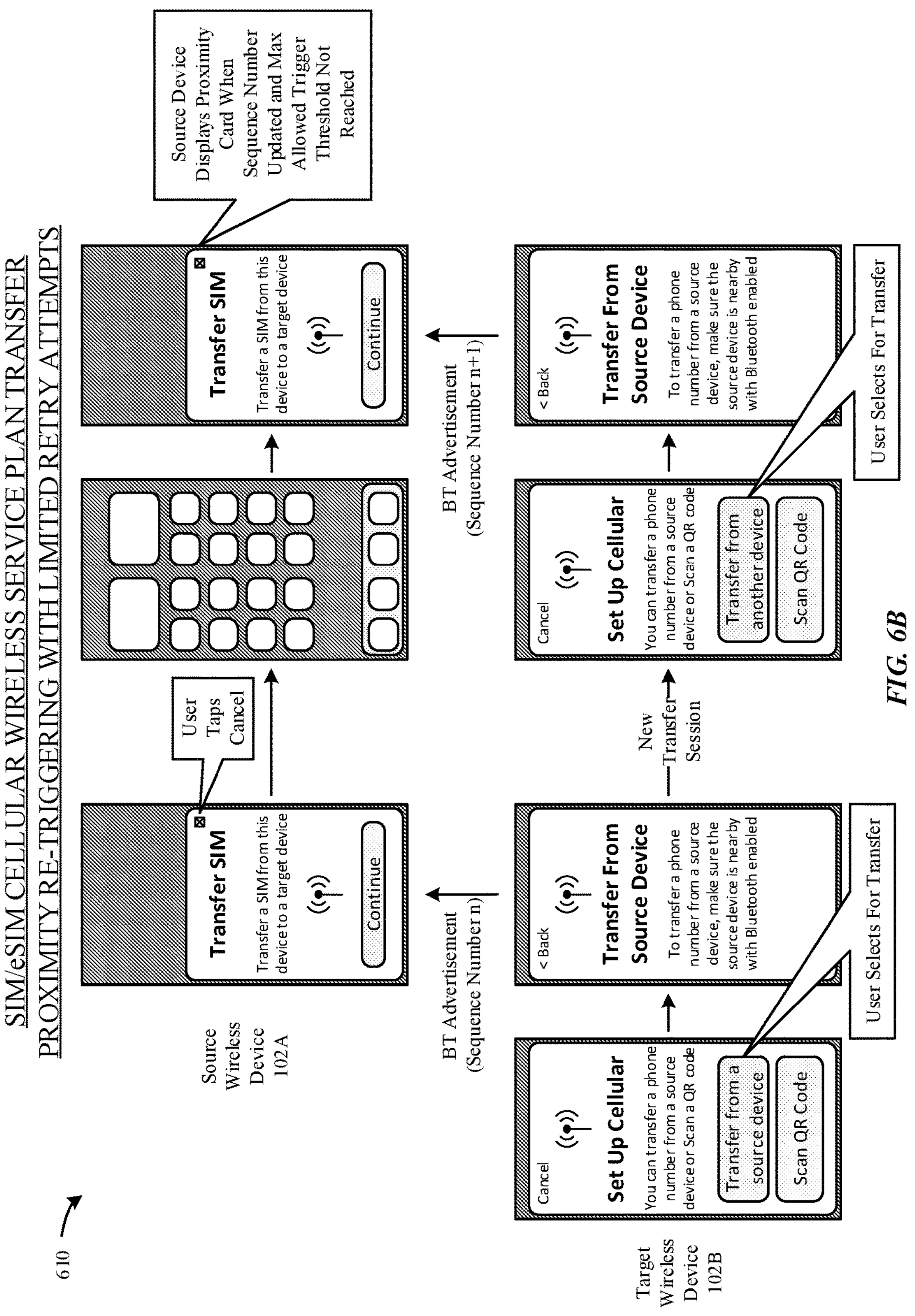
FIGS. 6B and 6C illustrate a diagram and flowchart respectively of an example of SIM/eSIM transfer proximity re-triggering with limited retry attempts, according to some embodiments.

FIG. 6B illustrates a diagram 610 that allows for re-triggering SIM transfer notifications at a source wireless device 102A with limited retry attempts. The target wireless device 102B can include a sequence number in a Bluetooth advertisement beacon that includes a SIM transfer action type. The sequence number included in the Bluetooth advertisement beacon can be re-used for a particular transfer session by the target wireless device 102B. The sequence number can be incremented (or changed to a different sequence number) for a different transfer session attempt by the target wireless device 102B, such as in response to a user of the target wireless device 102B cancelling a first transfer session and subsequently re-starting a second transfer session. As shown in FIG. 6B, the initial transfer (based on a user selection of the transfer button) at the target wireless device 102B can be unsuccessful, such as when a user of the source wireless device 102A cancels the transfer session. The user of the target wireless device 102B can start another transfer session and select the transfer button again, and the target wireless device 102B can broadcast a new Bluetooth advertisement beacon with an incremented (or changed) sequence number. The source wireless device 102A can use the sequence numbers in the Bluetooth advertisement beacons to avoid re-triggering display of the Transfer SIM notification message based on whether a sequence number in a received Bluetooth advertisement beacon with a SIM transfer action type includes a repeated (previously received) sequence number or a new (incremented or updated) sequence number. When the sequence number is different from previously received sequence numbers (or from a most recently received sequence number) and when a maximum allowed trigger threshold has not been reached, the source wireless device 102A can display a new Transfer SIM notification message.

Figure 6C:
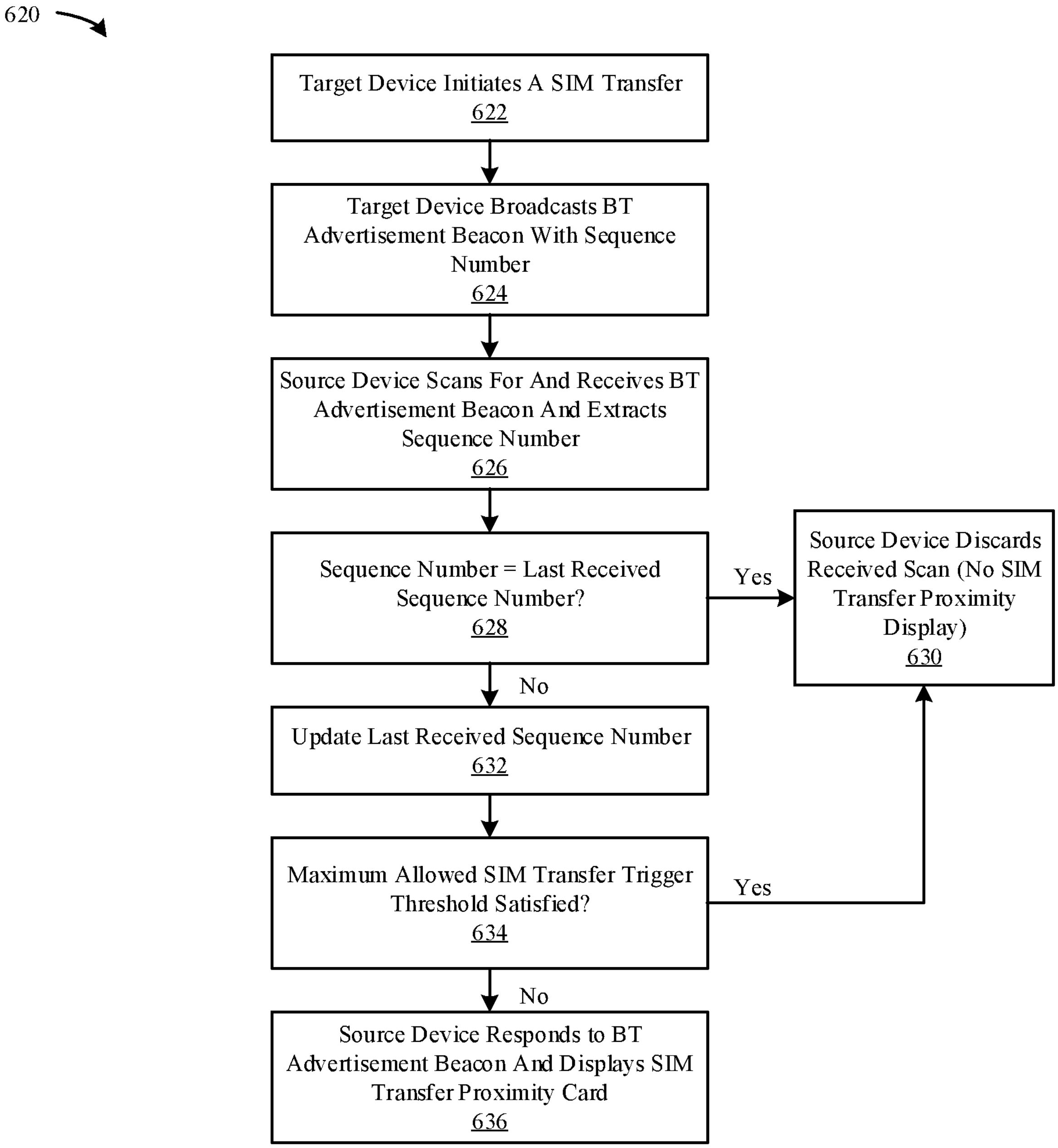

FIG. 6C illustrates a flowchart 620 of an example of limiting retry attempts at a source wireless device 102A for a SIM/eSIM cellular wireless service plan transfer process. At 622, a target wireless device 102B initiates the SIM transfer process. At 624, the target wireless device 102B broadcasts a Bluetooth advertisement beacon that includes a sequence number and a SIM transfer action type. At 626, the source wireless device 102A scans for and receives the Bluetooth advertisement beacon and extracts the sequence number included therein. At 628, the source wireless device 102A determines whether the sequence number extracted from the Bluetooth advertisement beacon matches a most recently (last) received (or a previously received) sequence number. When the sequence number matches, the source wireless device 102A, at 630 can discard the received scanned Bluetooth advertisement beacon and not display a SIM Transfer notification (proximity card). When the sequence number does not match the most recently (last) received sequence number, the source wireless device 102A, at 632, can update a stored value for a most recently received sequence number. At 634, the source wireless device 102A can determine whether a maximum allowed SIM Transfer trigger threshold is satisfied, e.g., a maximum number of Bluetooth advertisement beacons with distinct sequence numbers have been received within a threshold time period. When the maximum allowed SIM Transfer trigger threshold is satisfied, the source wireless device 102A can, at 630, discard the received Bluetooth advertisement beacon and not display a SIM transfer notification. When the maximum allowed SIM Transfer trigger threshold is not satisfied, the source wireless device 102A, at 636, can respond to the Bluetooth advertisement beacon and display a SIM Transfer notification (proximity card) via a display of the source wireless device 102A. When the target wireless device 102B re-uses a sequence number used for a particular transfer session, the source wireless device 102A can avoid re-displaying a request for SIM transfer after cancellation by a user of a SIM Transfer notification. When the target wireless device 102B updates a sequence number used for a subsequent transfer session, the source wireless device 102A can display a new SIM Transfer notification unless a maximum number of SIM transfer notifications have already been displayed within a threshold time period.

Figure 6D:
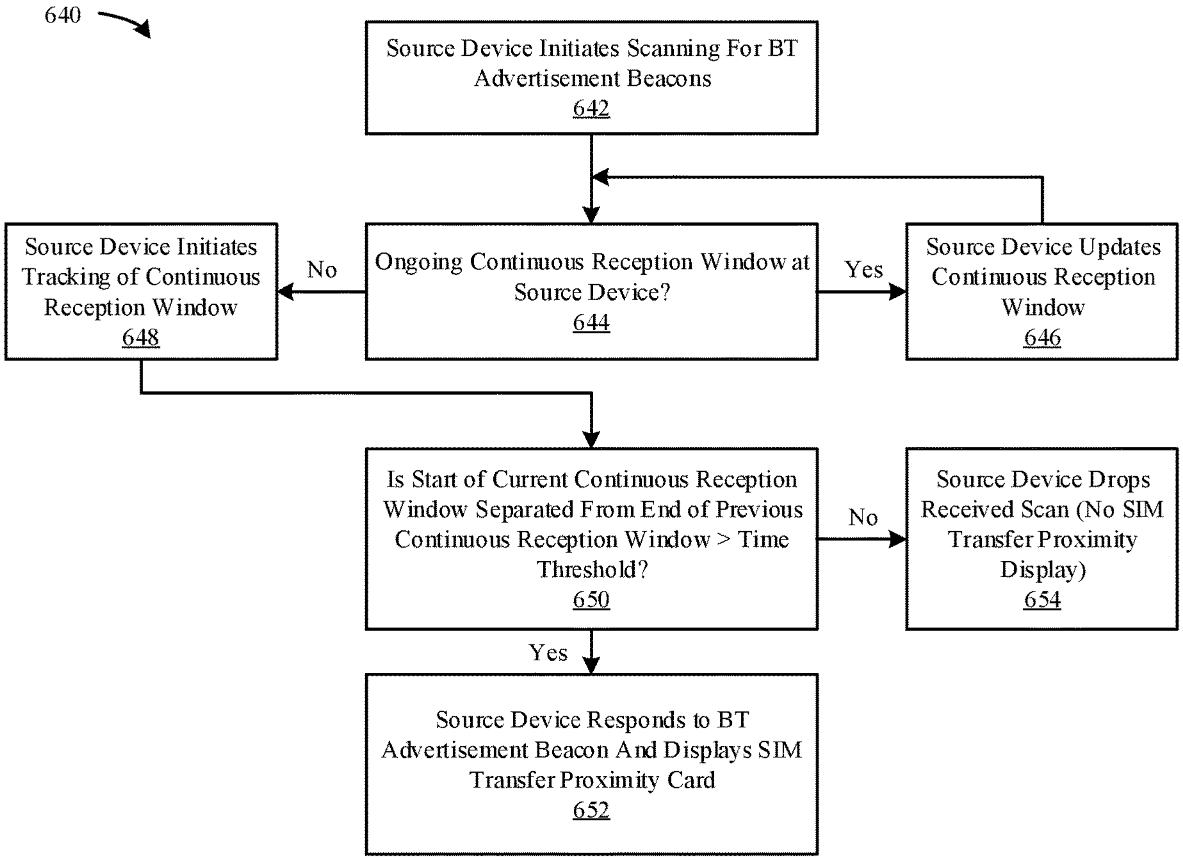
FIG. 6D illustrates a flow chart of an example of SIM/eSIM transfer proximity re-triggering with discontinuous reception detection, according to some embodiments.

FIG. 6D illustrates a flowchart 640 for managing SIM transfer notifications at a source wireless device 102A. The target wireless device 102B can transmit Bluetooth advertisement beacons repeatedly during a continuous time window and then stop transmitting the Bluetooth advertisement beacons after a time threshold has elapsed (or after a transfer process has started with a source wireless device 102A). The target wireless device 102B can restart transmitting Bluetooth advertisement beacons during a subsequent continuous time window after a quiescent time period has elapsed between the continuous time windows. The source wireless device 102A can monitor a sliding window of continuous scan detection of one or more Bluetooth advertisement beacons that include a SIM Transfer action type. Repetitive Bluetooth advertisement beacons of the SIM Transfer action type received after a first Bluetooth advertisement beacon of the SIM Transfer action type within a single continuous scan time window can be ignored. The source wireless device 102A can display SIM Transfer notifications for Bluetooth advertisement beacons received in non-overlapping continuous time windows separated by a preconfigured threshold period of time, such as at least 30 seconds.

At 642, the source wireless device 102A initiates scanning for Bluetooth advertisement beacons that include a SIM Transfer action type. At 644, the source wireless device 102A determines whether the Bluetooth advertisement scanning is part of an ongoing continuous time window of reception of Bluetooth advertisement beacons from the target wireless device 102B. When not part of an ongoing continuous time window of reception, the source wireless device 102A, at 648, initiates tracking of a continuous time window of reception. When part of an ongoing continuous time window of reception, the source wireless device 102A, at 646, updates tracking of an ongoing continuous time window of reception. At 650, the source wireless device 102A determines whether the start of a current continuous time window of reception is separated from the end of a previous (most recent) continuous time window of reception by at least a preconfigured time threshold period of time, e.g., 30 seconds. When the current continuous time window of reception is not separated from the last continuous time window of reception by at least the preconfigured time threshold period of time, the source wireless device 102A, at 654, can ignore received Bluetooth advertisement beacons that include a SIM Transfer action type and refrain from displaying a SIM Transfer notification (proximity card). When the current continuous time window of reception is separated from the last continuous time window of reception by at least the preconfigured time threshold period of time, the source wireless device 102A, at 652, can respond to a received Bluetooth advertisement beacon that includes a SIM Transfer action type and present a SIM Transfer notification (proximity card) via a display of the source wireless device 102A.

Figure 7A:
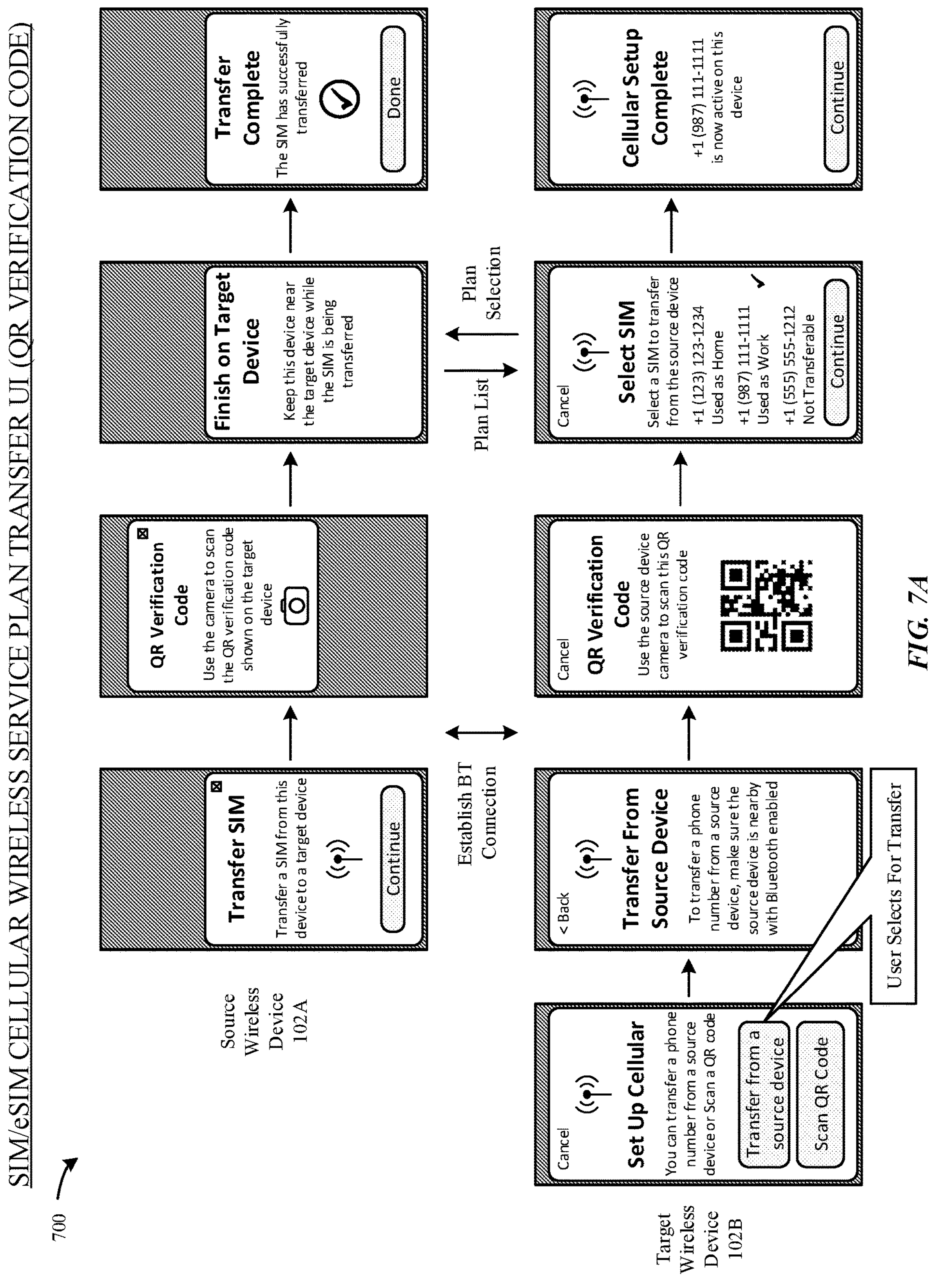
FIG. 7A illustrates exemplary UI screens for transfer of a SIM or eSIM cellular wireless service plan using a quick response (QR) verification code, according to some embodiments.

FIG. 7A illustrates a diagram 700 of a series of exemplary user interface screens displayed on a source wireless device 102A and on a target wireless device 102B during a cellular wireless service plan transfer process that uses a QR code in place of a verification code for authentication as illustrated in FIG. 4C. Initially, at the target wireless device 102B, after selecting to set up a cellular wireless service plan, a user of the target wireless device 102B is presented an option to transfer a phone number (by which to identify a cellular wireless service plan for transfer) from a source wireless device 102A or to alternatively scan a QR code. Upon selection of the option to transfer from a source wireless device 102A, a second UI screen advises the user to ensure the source wireless device 102A is nearby with Bluetooth enabled to allow for a short-range, secure Bluetooth communication channel to be established between the target wireless device 102B and the source wireless device 102A. The source wireless device 102A presents a Transfer SIM notification message responsive to receipt of a Bluetooth advertisement beacon from the target wireless device 102B, where the Bluetooth advertisement beacon can include a SIM Transfer action flag indicating the requested SIM transfer. The source wireless device 102A can measure the strength of the received Bluetooth advertisement beacon and present the Transfer SIM notification message when a received signal strength satisfies a signal strength threshold to ensure the target wireless device 102B and the source wireless device 102A are within a threshold distance of each other. In some embodiments, the source wireless device 102A will not respond to the Bluetooth advertisement beacon when the source wireless device 102A is not protected by a passcode. In some embodiments, the source wireless device 102A will not respond to the Bluetooth advertisement beacon when there are no eSIMs 208 installed on the source wireless device 102A. In some embodiments, the source wireless device 102A will not respond to the Bluetooth advertisement beacon when the display of the source wireless device 102A is in an off state. In some embodiments, entry of a passcode for the source wireless device 102A is required to proceed when the display of the source wireless device 102A is in an on and locked state. After approval by the user of the source wireless device 102A to continue with the SIM/eSIM cellular wireless service plan transfer, the source wireless device 102A presents a screen requiring a camera scan of a quick response (QR) verification code displayed on the target wireless device 102B. The target wireless device 102B can display the QR verification code and notify the user of the target wireless device 102B to have the QR verification code scanned by the source wireless device 102A to continue with the SIM/eSIM cellular wireless service plan transfer process. After successful verification, the source wireless device 102A and the target wireless device 102B can complete establishment of the secure Bluetooth connection. The source wireless device 102A provides to the target wireless device 102B, via the secure Bluetooth connection, a list of cellular wireless service plans available on the source wireless device 102A from which to select a cellular wireless service plan for transfer to the target wireless device 102B. The cellular wireless service plan list can include information for each cellular wireless service plan, such as an associated phone number, a user-designated label, and/or an indication of transferability. A user selection of a cellular wireless service plan is returned to the source wireless device 102A, which can obtain from an MNO entitlement server 304 a transfer token for transfer of the selected cellular wireless service plan. In some embodiments, the source wireless device 102A can communicate the transfer token to the target wireless device 102B via the Bluetooth communication channel. The target wireless device 102B can use the transfer token to obtain a new eSIM 208 reserved for transfer of the cellular wireless service plan to the target wireless device 102B. A successful transfer completion notification can be provided at the source wireless device 102A, and a notification that the cellular wireless service plan has successfully been downloaded, installed, and activated can be presented at the target wireless device 102B. The secure Bluetooth connection is closed after successful transfer of the cellular wireless service plan, as the secure Bluetooth connection is intended only for use for a single transfer session.

Figure 7B:
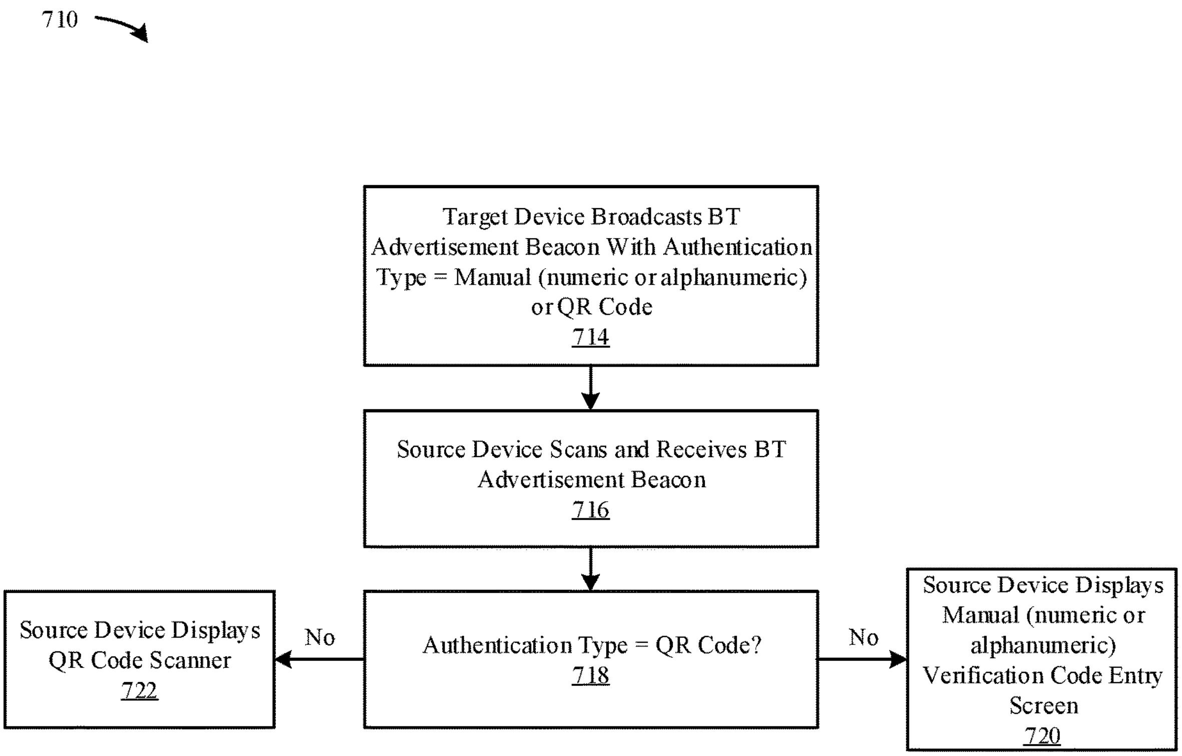
FIG. 7B illustrates a flowchart of an exemplary cellular wireless service plan transfer authentication, according to some embodiments.

FIG. 7B illustrates a flowchart 710 for authentication between the target wireless device 102B and the source wireless device 102A using a manually entered verification code or a QR verification code as part of a SIM transfer process. At 714, the target wireless device 102B broadcasts a Bluetooth advertisement beacon that includes a SIM Transfer action type and an authentication type value that indicates use of a manual verification code or a QR code for authentication between the target wireless device 102B and the source wireless device 102A. At 716, the source wireless device 102A scans and receives the Bluetooth advertisement beacon. At 718, the source wireless device 102A determines whether authentication with the target wireless device 102B uses a manually entered verification code or scanning of a QR code based on the authentication type value included in the Bluetooth advertisement beacon. At 722, when a QR code is used for authentication, the source wireless device 102A displays a QR code scanner window (e.g., by requesting use of camera or automatically enabling a camera with a scan window displayed) for scanning a QR code for verification displayed on the target wireless device 102B. At 720, when a manually entered verification code is required, the source wireless device 102A displays a manual verification code entry screen on the display of the source wireless device 102A. Manual verification codes can be numeric or alphanumeric in value, in various embodiments, and can be displayed on the target wireless device 102B for manual entry at the source wireless device 102A.

Figure 7C:
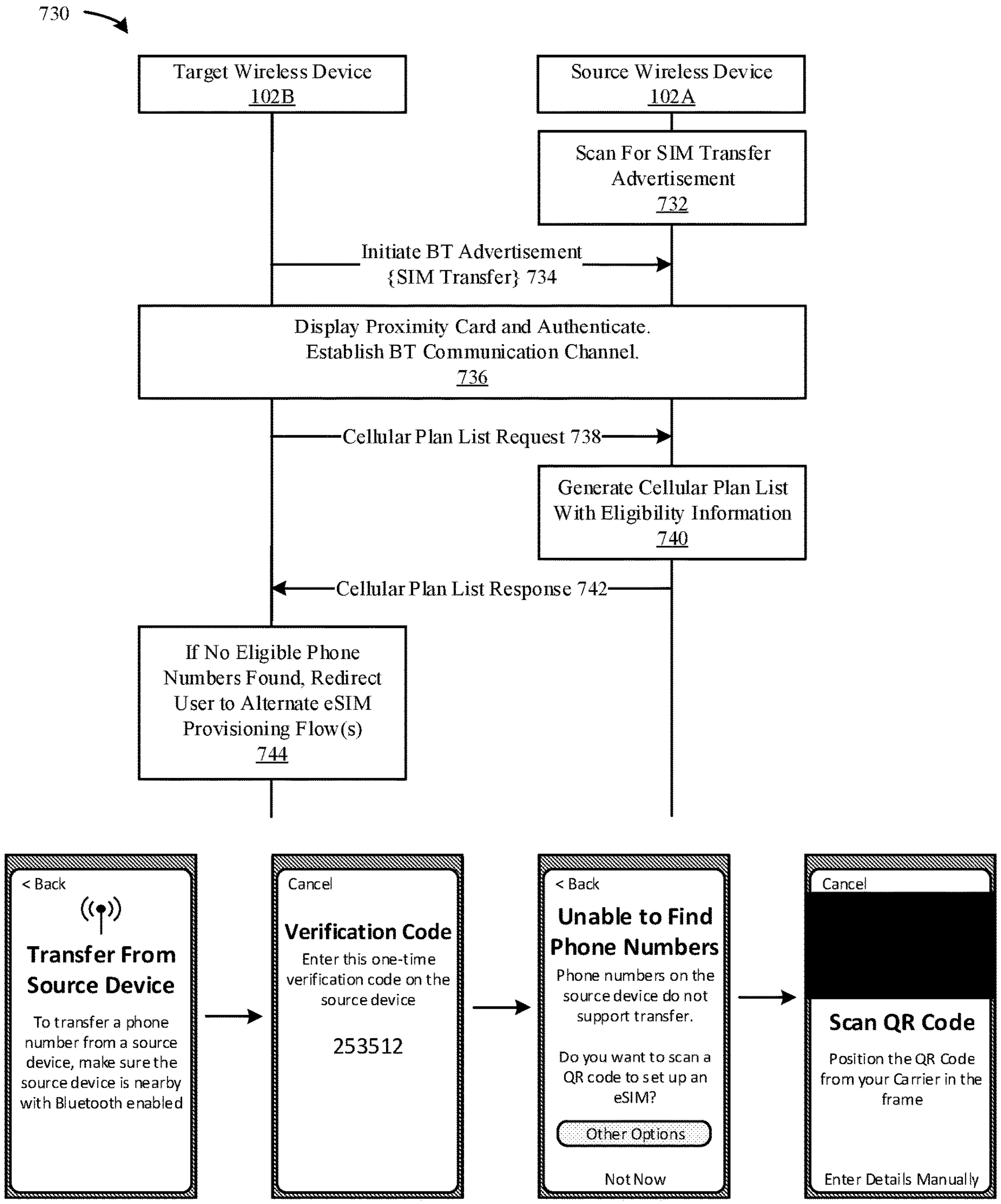
FIG. 7C illustrates a flowchart and UI screens of an example of cellular wireless service plan transfer authentication, according to some embodiments.

FIG. 7C illustrates a diagram 730 a set of actions and user interface screens to provide an alternative transfer method when encountering an error condition, such as when the source wireless device 102A has no SIMs or eSIMs installed or available for transfer to the target wireless device 102B. At 732, the source wireless device 102A initiates scanning for Bluetooth advertisement messages that include a SIM Transfer action type. At 734, the target wireless device 102B initiates broadcasting one or more Bluetooth advertisement messages that include a SIM Transfer action type. At 736, the source wireless device 102A displays a SIM transfer notification (proximity card) and after successful authentication (such as using a manually entered verification code or a scanned QR verification code), a secure Bluetooth communication channel is established between the target wireless device 102B and the source wireless device 102A. At 738, The target wireless device 102B sends to the source wireless device 102A a request for cellular wireless service plans available on the source wireless device 102A. In some embodiments, the request queries for a list of all cellular wireless service plans. In some embodiments, the request queries for a list of transferrable cellular wireless service plans. At 740, the source wireless device 102A generates a cellular wireless service plan list that includes transfer eligibility information. At 742, the source wireless device 102A replies to the target wireless device 102B with a cellular wireless service plan list. In some embodiments, when no cellular wireless service plans are available for transfer, the source wireless device 102A can return an empty cellular wireless service plan list or another message indicating the absence of cellular wireless service plans for transfer. In some embodiments, the cellular wireless service plan list includes a transferability designation for each cellular wireless service plan included in the cellular wireless service plan list, and the target wireless device 102B can determine whether there is at least one transferable cellular wireless service plan available on the source wireless device 102A. At 744, when no cellular wireless service plans are available for transfer, the target wireless device 102B can redirect the user to an alternate SIM/eSIM cellular wireless service plan provisioning flow. In some embodiments, the target wireless device 102B presents a notification indicating that no transferrable cellular wireless service plans were found on the source wireless device 102A. In some embodiments, the target wireless device 102B presents an option to redirect the user to one or more alternate SIM/eSIM cellular wireless service plan provisioning flows. In some embodiments, the target wireless device 102B provides an option to scan a QR code provided by an MNO 114 to obtain an eSIM 208 from an MNO provisioning server 116.

Figure 8A:
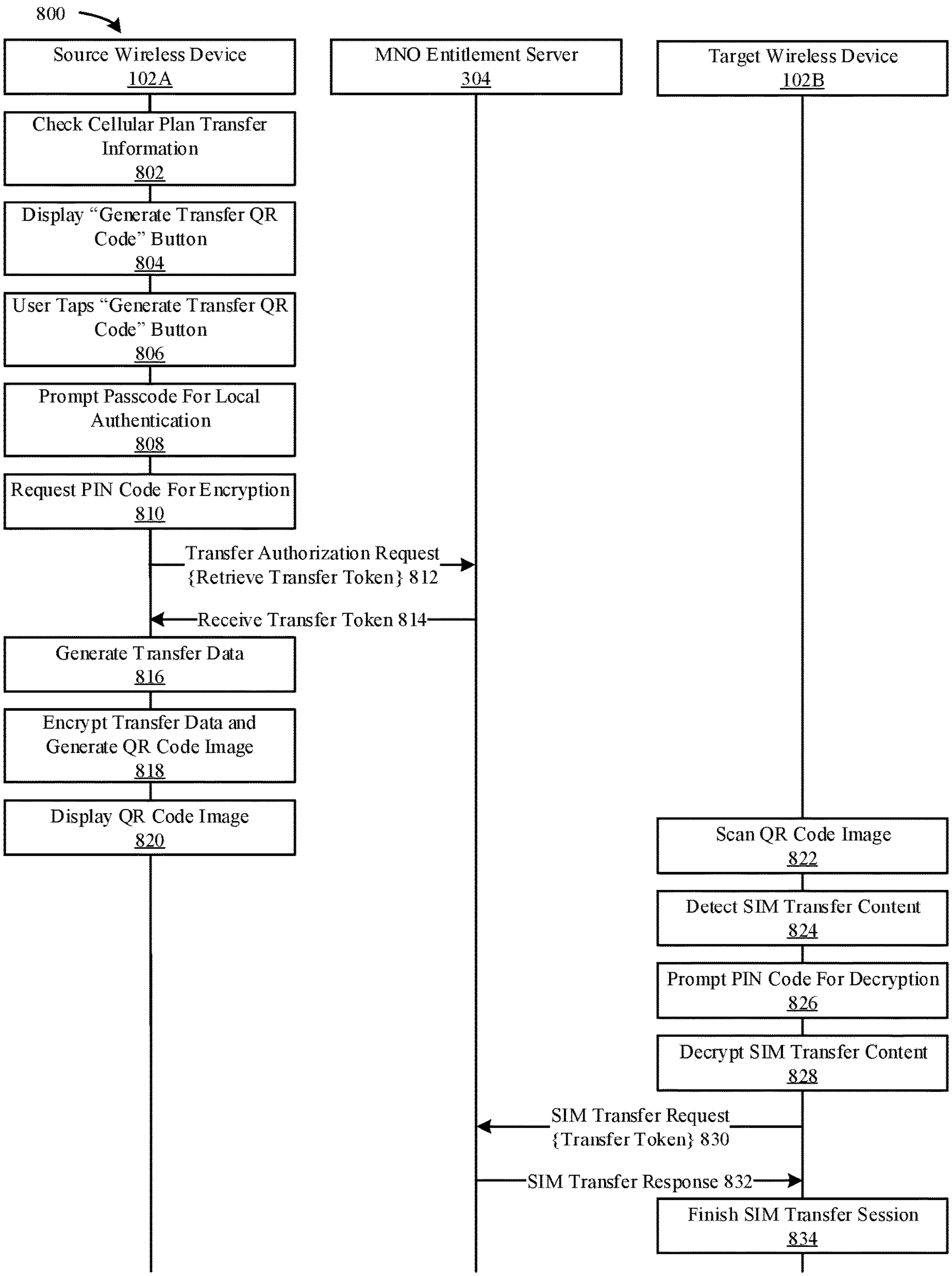
FIG. 8A illustrates an exemplary sequence of actions performed to transfer a cellular wireless service plan associated with a SIM or eSIM from a source wireless device to a target wireless device via QR code, according to some embodiments.

FIG. 8A illustrates a diagram 800 of a series of actions performed by a source wireless device 102A and a target wireless device 102B to transfer a cellular wireless service plan, associated with a SIM on a UICC 118 or with an eSIM 208 installed on an eUICC 108 of the source wireless device 102A, to a new eSIM 208 reserved for download to the target wireless device 102B. The source wireless device 102A can provide to a user an option to generate a QR code that captures information for transfer of the cellular wireless service plan associated with the SIM or the eSIM 208. At 802, the source wireless device 102A determines transfer eligibility information for a cellular wireless service plan selected by a user. When a selected cellular wireless service plan is eligible for transfer to another wireless device 102 (or to a specifically identified target wireless device 102B), the source wireless device 102A, at 804, displays an option for generating a QR code to transfer the selected cellular wireless service plan, e.g., a "Generate Transfer QR Code" button on the display of the source wireless device 102A. At 806, a user enters an input (e.g., a tap on a displayed button) to indicate a request to generate the QR code for a selected cellular wireless service plan. At 808, the source wireless device 102A prompts the user to enter a passcode (e.g., such as used to unlock the source wireless device 102A) to provide local authentication for the cellular wireless service plan transfer. At 810, the source wireless device 102A requests the user to enter a PIN code to be used for encrypting the QR code for transfer of the selected cellular wireless service plan. At 812, the source wireless device 102A sends, to an MNO entitlement server 304 associated with the cellular wireless service plan to be transferred, a transfer authorization request message that indicates a request for a transfer token to transfer the selected cellular wireless service plan. At 814, upon successful authorization, the MNO entitlement server 304 returns to the source wireless device 102A a transfer token to use for transfer of the cellular wireless service plan. At 816, the source wireless device 102A generates transfer data for the QR code. The transfer data can include: i) the transfer token obtained from the MNO entitlement server 304, ii) a phone number associated with the cellular wireless service plan, iii) details regarding the MNO 114 associated with the cellular wireless service plan, iv) a network address (e.g., a universal resource locator or fully qualified domain name) for an MNO entitlement server 304 with which a target wireless device 102B can authenticate for transfer of the cellular wireless service plan, v) an international mobile subscriber identity (IMSI) value, vi) an international mobile equipment identity (IMEI) value, vii) a timestamp of validity, and/or viii) encryption format details. At 818, the source wireless device 102A encrypts the transfer data using the previously requested PIN code for encryption and generates a QR code image. In some embodiments, the PIN code is a one-time-use PIN code having a limited time period during which the PIN code is valid (e.g., expires after a period of time). In some embodiments, a secure intent verification procedure (not shown) is also performed at the source wireless device 102A to confirm intent of a user to transfer the cellular wireless service plan.

At 822, the target wireless device 102B scans the QR code image. In some embodiments, the source wireless device 102A and the target wireless device 102B are within proximity of each other, and the QR code image is displayed at the source wireless device 102A for scanning by a camera of the target wireless device 102B. In some embodiments, the source wireless device 102A and the target wireless device 102B are distant from each other, and the QR code image is provided by an out-of-band communication channel to the target wireless device 102B, e.g., via an email service or via a message service. At 824, the target wireless device 102B detects the QR code content includes information for transfer of a cellular wireless service plan. At 826, the target wireless device 102B prompts a user for entry of the PIN code for decryption. After successful entry of the PIN code, the target wireless device 102B decrypts the QR code content to retrieve the information for transfer of the cellular wireless service plan. The QR code content includes a transfer token, which the target wireless device 102B provides, at 830, to the MNO entitlement server 304 in a request to transfer the cellular wireless service plan to the target wireless device 102B. At 832, upon successful verification based on the provided transfer token, the MNO entitlement server 304 provides, at 832 to the target wireless device 102B, a response message that includes information for downloading a new eSIM 208 from an MNO provisioning server 116. The new eSIM 208 can be previously reserved based on authorization for transfer by the MNO entitlement server 304 in response to the transfer request from the source wireless device 102A. In particular, the MNO entitlement server 304 can communicate with the MNO provisioning server 116 when the transfer token is created and provided to the source wireless device 102A, and the MNO provisioning server 116 can prepare an eSIM 208 for subsequent download to the target wireless device 102B.

Figure 8B:
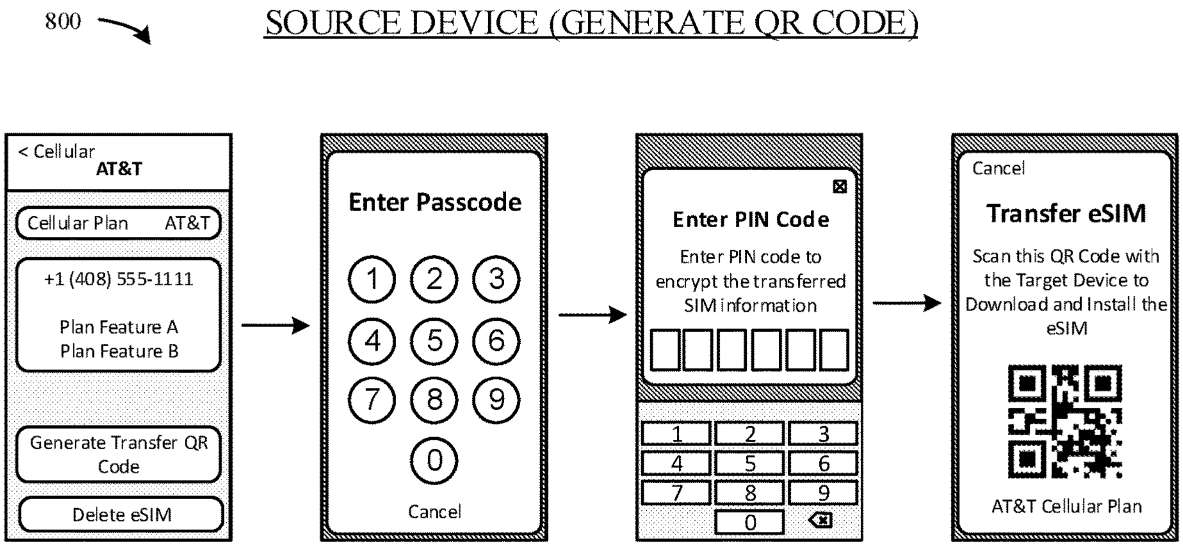
FIG. 8B illustrates exemplary UI screens for transfer of a SIM or eSIM cellular wireless service plan using a QR code, according to some embodiments.
Figure 8B:
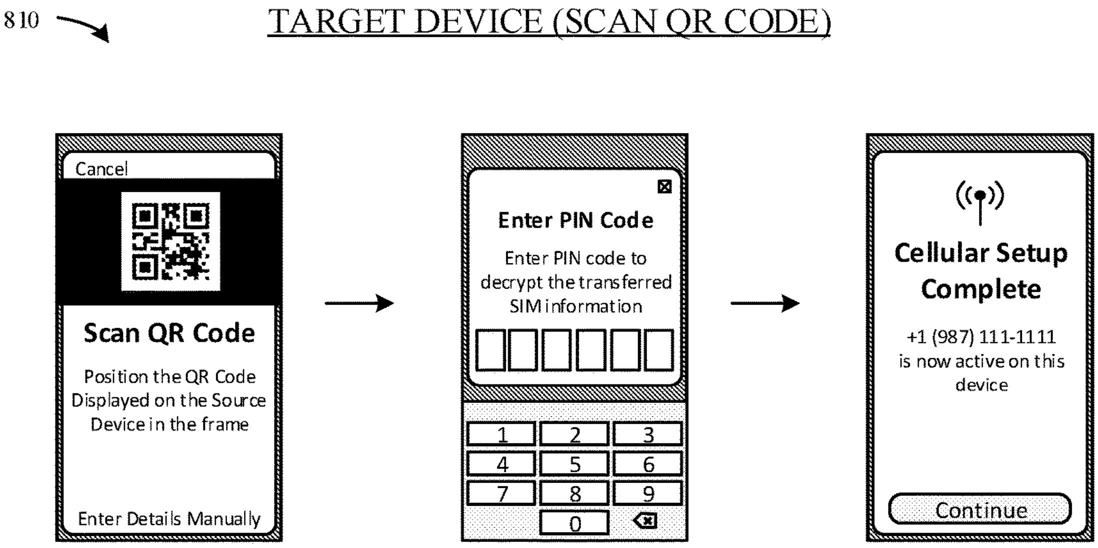

FIG. 8B illustrates diagrams 800, 810 of exemplary UI screens that can be presented at a source wireless device 102A and at a target wireless device 102B during transfer of a cellular wireless service plan using a QR code. The source wireless device 102A can present an option to generate a transfer QR code for a selected cellular wireless service plan, and prompt for a passcode entry when a user requests generation of the transfer QR code. The source wireless device 102A can request entry of a PIN code to encrypt the transfer data for the transferred cellular wireless service plan. The source wireless device 102A can generate and display a QR code based on the encrypted transfer data for scanning by the target wireless device 102B. The target wireless device 102B can scan the QR code and decrypt the contents of the QR code to retrieve the transfer data for transfer of the cellular wireless service plan. The target wireless device 102B can use the transfer data to authenticate with an MNO entitlement server 304 and subsequently download, install, and activate an eSIM 208 associated with the transferred cellular wireless service plan. The target wireless device 102B can provide an indication when the cellular wireless service plan has been successfully transferred and available for use by (active on) the target wireless device 102B.

Representative Methods

In a representative embodiment, a target wireless device 102B performs a method to transfer cellular wireless service from a source wireless device 102A to the target wireless device 102B by at least: i) broadcasting a Bluetooth advertisement beacon including an action type indicating a request to transfer cellular wireless service to the target wireless device 102B; ii) receiving, from the source wireless device 102A, a request to initiate a secure Bluetooth connection between the source wireless device 102A and the target wireless device 102B; iii) establishing the secure Bluetooth connection with the source wireless device 102A after successful verification of the source wireless device 102A via an authentication procedure; iv) sending, to the source wireless device 102A, a plan transfer request to transfer a particular cellular wireless service plan associated with a SIM or an eSIM 208 selected from a list of cellular wireless service plans received from the source wireless device 102A; v) receiving, from the source wireless device 102A, a plan transfer response that includes a transfer token associated with a new eSIM 208 reserved for transfer of the particular cellular wireless service plan; vi) sending, to an MNO entitlement server 304, a cellular service transfer request including the transfer token for authentication; vii) receiving, from the MNO entitlement server 304, a cellular service transfer response that indicates approval to obtain the new eSIM 208; and viii) downloading, from an MNO provisioning server 116, the new eSIM 208.

In some embodiments, the authentication procedure includes the target wireless device 102B: i) generating a random PIN code; ii) sending, to the source wireless device 102A, an authentication request; iii) receiving, from the source wireless device 102A, an authentication response that includes a PIN code value; and iv) validating the pin code value matches the generated random PIN code. In some embodiments, the authentication procedure includes the target wireless device 102B: generating a QR verification code, and presenting the QR verification code via a display of the target wireless device 102B for scanning by the source wireless device 102A. In some embodiments, the method performed by the target wireless device 102B further includes: i) installing and activating the new eSIM 208 on an eUICC 108 of the target wireless device 102B; ii) sending, to the source wireless device 102A, an indication that transfer of the particular cellular wireless service plan is complete; and iii) closing the secure Bluetooth connection with the source wireless device 102A. In some embodiments, the Bluetooth advertisement beacon includes a unique identifier for the source wireless device 102A. In some embodiments, the target wireless device 102B obtains the unique identifier for the source wireless device 102A from a cloud network service 302 associated with the source wireless device 102A and the target wireless device 102B. In some embodiments, the Bluetooth advertisement beacon includes a sequence number that increments with each Bluetooth advertisement beacon that includes the action type indicating the request to transfer cellular wireless service to the target wireless device 102B. In some embodiments, the list of cellular wireless service plans includes for each cellular wireless service plan a phone number and an indication whether the cellular wireless service plan is transferable to the target wireless device 102B. In some embodiments, the Bluetooth advertisement beacon includes an authentication type indicating either a QR code or a manual numeric or alphanumeric code is required for authentication. In some embodiments, the Bluetooth advertisement beacon includes a device type indicating a particular device type for the target wireless device 102B. In some embodiments, the source wireless device 102A reads the device type indicated in the Bluetooth advertisement beacon to determine whether to process further or ignore the Bluetooth advertisement beacon from the target wireless device 102B. In some embodiments, the source wireless device 102A further processes the Bluetooth advertisement beacon when the particular device type for the target wireless device 102B matches a corresponding particular device type for the source wireless device 102A. In some embodiments, the source wireless device 102A ignores the Bluetooth advertisement beacon when the particular device type for the target wireless device 102B does not match to the corresponding particular device type for the source wireless device 102A.

In another representative embodiment, a target wireless device 102B performs a method to transfer a cellular wireless service plan from a source wireless device 102A to the target wireless device 102B by at least: i) scanning a QR code presented via a display of the source wireless device 102A; ii) detecting the QR code includes contents to transfer the cellular wireless service plan from the source wireless device 102A to the target wireless device 102B; iii) obtaining, via an input/output of the target wireless device 102B, a PIN code value; iv) decrypting the contents of the QR code using the PIN code value, the contents including a transfer token; v) sending, to an MNO entitlement server 304 a request to transfer the cellular wireless service plan, the request including the transfer token; vi) receiving, from the MNO entitlement server 304, a response that indicates authorization to download, from an MNO provisioning server 116, an eSIM 208 associated with the transfer token and previously reserved for transfer of the cellular wireless service plan; and vii) downloading and installing the eSIM 208 on an eUICC 108 of the target wireless device 102B.

In a further representative embodiment, a source wireless device 102A performs a method to transfer cellular wireless service to a target wireless device 102B by at least: i) receiving, from the target wireless device 102B, a Bluetooth advertisement beacon including an action type indicating a request to transfer a cellular wireless service plan to the target wireless device 102B; ii) sending, to the target wireless device 102B, a request to initiate a secure Bluetooth connection between the source wireless device 102A and the target wireless device 102B; iii) establishing the secure Bluetooth connection with the target wireless device 102B after successful verification of the source wireless device 102A to the target wireless device 102B via an authentication procedure; iv) receiving, from the target wireless device 102B, a plan transfer request to transfer a particular cellular wireless service plan associated with a SIM or an eSIM 208 selected from a list of cellular wireless service plans received from the source wireless device 102A; v) obtaining, from an MNO entitlement server 304, a transfer token associated with a new eSIM 208 reserved for transfer of the particular cellular wireless service plan; and vi) sending, to the target wireless device 102B, a plan transfer response that includes the transfer token.

In some embodiments, the authentication procedure includes the source wireless device 102A: i) receiving, from the target wireless device 102B, an authentication request; ii) obtaining, via an input/output of the source wireless device 102A, a PIN code value; iii) sending, to the target wireless device 102B, an authentication response that includes the PIN code value. In some embodiments, the authentication procedure includes the source wireless device 102A scanning, via a camera of the source wireless device 102A, a QR verification code presented via a display of the target wireless device 102B. In some embodiments, the Bluetooth advertisement beacon includes a unique identifier for the source wireless device 102A. In some embodiments, the method formed by the source wireless device 102A further includes uploading the unique identifier for the source wireless device 102A to a cloud network service 302 associated with the source wireless device 102A and the target wireless device 102B. In some embodiments, the method performed by the source wireless device 102A further includes ignoring Bluetooth advertisement beacons that do not include the unique identifier for the source wireless device 102A. In some embodiments, the method performed by the source wireless device 102A further includes: i) presenting, via a display of the source wireless device 102A, a notification alert indicating the request to transfer the cellular wireless service plan to the target wireless device 102B when the Bluetooth advertisement beacon includes the unique identifier for the source wireless device; and ii) refraining from displaying the notification alert when the Bluetooth advertisement beacon does not include the unique identifier for the source wireless device 102A. In some embodiments, the Bluetooth advertisement beacon includes a sequence number that differs from Bluetooth advertisement beacons, previously received from the target wireless device 102B, which include the action type indicating the request to transfer the cellular wireless service plan to the target wireless device 102B. In some embodiments, the method performed by the source wireless device 102A further includes ignoring Bluetooth advertisement beacons that include identical sequence numbers to Bluetooth advertisement beacons, previously received from the target wireless device 102B, which include the action type indicating the request to transfer the cellular wireless service plan to the target wireless device 102B. In some embodiments, the method performed by the source wireless device 102A further includes: i) measuring a received signal strength of the Bluetooth advertisement beacon; and ii) sending the request to initiate the secure Bluetooth connection only when the received signal strength satisfies a signal strength threshold. In some embodiments, the source wireless device 102A obtains user consent to transfer the cellular wireless service plan to the target wireless device 102B before establishing the secure Bluetooth connection with the target wireless device 102B. In some embodiments, the list of cellular wireless service plans includes for each cellular wireless service plan a phone number and an indication whether the cellular wireless service plan is transferable to the target wireless device 102B. In some embodiments, the Bluetooth advertisement beacon includes an authentication type indicating a quick response (QR) code and/or a manual numeric or alphanumeric code is required for authentication. In some embodiments, the Bluetooth advertisement beacon includes a device type indicating a particular device type for the target wireless device 102B, and the source wireless device 102A is configured to ignore the Bluetooth advertisement beacon when the particular device type value for the target wireless device 102B does not match to a corresponding particular device type value for the source wireless device 102A.

In an additional representative embodiment, a source wireless device 102A performs a method to transfer a cellular wireless service plan from the source wireless device 102A to a target wireless device 102B by at least: i) obtaining, via an input/output of the source wireless device 102A, user consent to generate a QR code to transfer the cellular wireless service plan to a target wireless device 102B; ii) obtaining, from an MNO entitlement server 304, a transfer token for transfer of the cellular wireless service plan; iii) generating the QR code based on the transfer token and additional transfer data; and iv) displaying the QR code via a display of the source wireless device 102A for scanning by the target wireless device 102B.

In some embodiments, the method performed by the source wireless device 102A further includes: i) obtaining, via the input/output of the source wireless device 102A, a PIN code value; and ii) encrypting the QR code with the PIN code value prior to displaying the QR code. In some embodiments, the method performed by the source wireless device 102A further includes performing a biometric scan and/or requiring a numeric or alphanumeric passcode entry to authenticate a user of the source wireless device 102A prior to generating the QR code.

Representative Device

Figure 9:
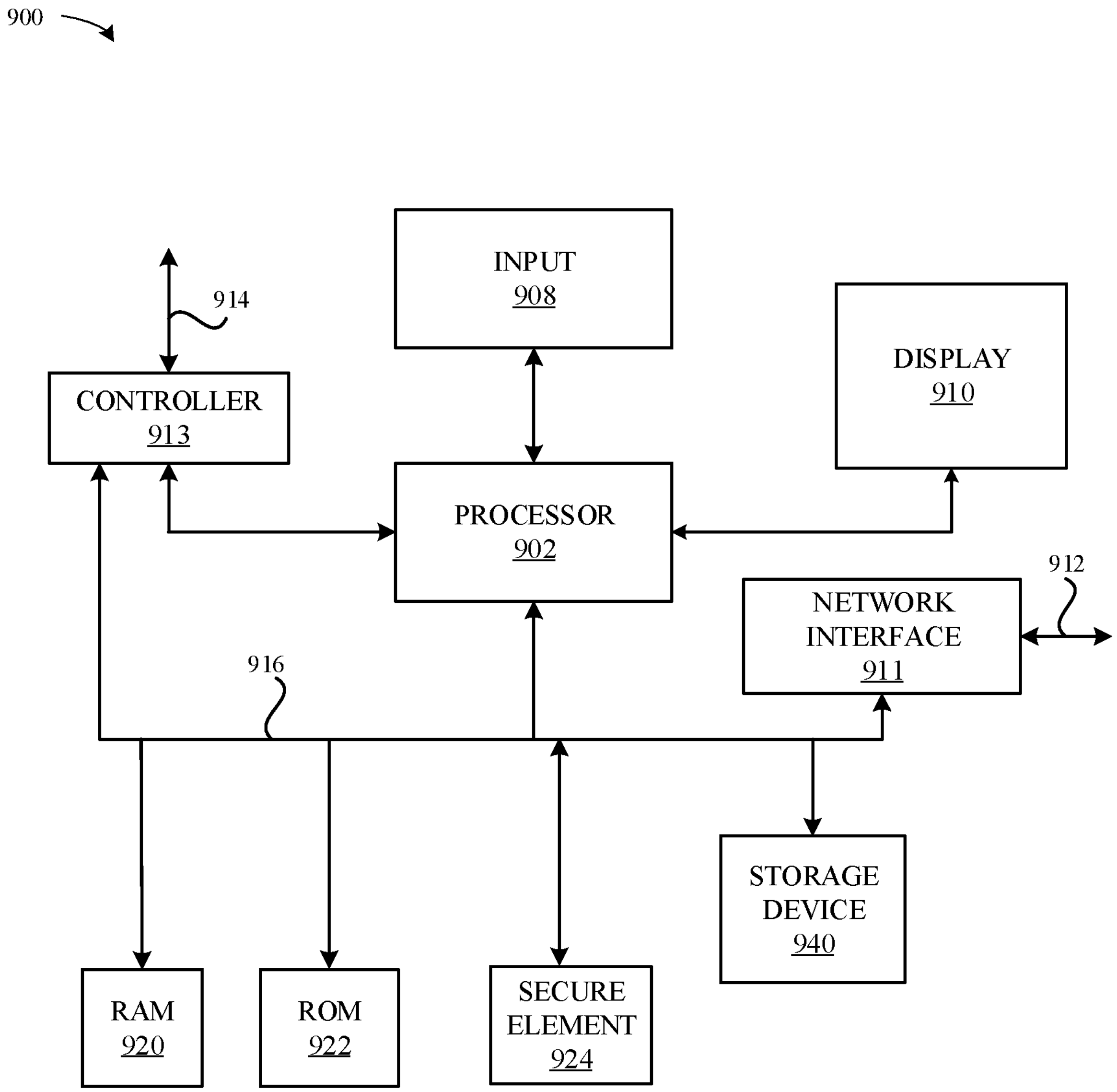
FIG. 9 illustrates a block diagram of exemplary elements of a mobile wireless device, according to some embodiments.

FIG. 9 illustrates a detailed view of a representative computing device 900 that can be used to implement various methods described herein, according to some embodiments. In particular, the detailed view illustrates various components that can be included in a wireless device 102, such as a source wireless device 102A, and/or a target wireless device 102B. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element (SE) 924, such as an eUICC 108, a UICC 118, or another secure storage for cellular wireless system access by a wireless device 102, a source wireless device 102A, and/or a target wireless device 102B.

Wireless Terminology

In accordance with various embodiments described herein, the terms “wireless communication device,” “wireless device,” “mobile wireless device,” “mobile station,”

and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A target wireless device comprising:

wireless circuitry comprising one or more antennas; and one or more processors communicatively coupled to the wireless circuitry and to a memory storing instructions that, when executed by the one or more processors, configure the target wireless device to:

broadcast a Bluetooth advertisement beacon including an action type indicating a request to transfer cellular wireless service to the target wireless device;

receive, from a source wireless device, a request to initiate a secure Bluetooth connection between the source wireless device and the target wireless device;

establish the secure Bluetooth connection with the source wireless device after successful verification of the source wireless device via an authentication procedure;

receive, from the source wireless device, a list of cellular wireless service plans available on the source wireless device;

when the list of cellular wireless service plans includes at least one cellular wireless service plan transferrable to the target wireless device:

send, to the source wireless device, a plan transfer request to transfer a particular cellular wireless service plan associated with a subscriber identity module (SIM) or an electronic SIM (eSIM) of the source wireless device selected by the target wireless device from the list of cellular wireless service plans received from the source wireless device;

receive, from the source wireless device, a plan transfer response that includes a transfer token associated with a new eSIM reserved for transfer of the particular cellular wireless service plan;

send, to a mobile network operator (MNO) entitlement server, a cellular service transfer request including the transfer token for authentication;

receive, from the MNO entitlement server, a cellular service transfer response that indicates approval to obtain the new eSIM; and download, from an MNO provisioning server, the new eSIM; and when the list of cellular wireless service plans does not include at least one cellular wireless service plan transferrable to the target wireless device: redirect to an alternate eSIM provisioning procedure.

2. The target wireless device of claim 1, wherein the authentication procedure comprises the target wireless device further configured to:

generate a random personal identification number (PIN) code;

send, to the source wireless device, an authentication request;

receive, from the source wireless device, an authentication response that includes a PIN code value; and validate the PIN code value matches the generated random PIN code.

3. The target wireless device of claim 1, wherein the authentication procedure comprises the target wireless device further configured to:

generate a quick response (QR) verification code; and present the QR verification code via a display of the target wireless device for scanning by the source wireless device.

4. The target wireless device of claim 1, wherein the target wireless device is further configured to:

install and activate the new eSIM on an embedded integrated circuit card (eUICC) of the target wireless device;

send, to the source wireless device, an indication that transfer of the particular cellular wireless service plan is complete; and close the secure Bluetooth connection with the source wireless device.

5. The target wireless device of claim 1, wherein the Bluetooth advertisement beacon includes a unique identifier for the source wireless device received from the source wireless device via an out-of-band communication channel other than the secure Bluetooth connection.

6. The target wireless device of claim 5, wherein the target wireless device obtains the unique identifier for the source wireless device from a cloud network service associated with the source wireless device and the target wireless device.

7. The target wireless device of claim 1, wherein the Bluetooth advertisement beacon includes a sequence number that increments or changes to a different value for distinct wireless service plan transfer sessions initiated by the target wireless device to request to transfer cellular wireless service to the target wireless device.

8. The target wireless device of claim 1, wherein the list of cellular wireless service plans includes for each cellular wireless service plan a phone number and an indication whether the cellular wireless service plan is transferable to the target wireless device.

9. The target wireless device of claim 1, wherein the Bluetooth advertisement beacon includes an authentication type indicating a quick response (QR) code and/or a manual numeric or alphanumeric code is required for authentication.

10. The target wireless device of claim 1, wherein:

the Bluetooth advertisement beacon includes a device type value indicating a particular device type for the target wireless device; and the source wireless device ignores the Bluetooth advertisement beacon when the device type value for the target wireless device does not match a corresponding device type value for the source wireless device.

11. A method for cellular wireless service transfer from a source wireless device to a target wireless device, the method comprising:

by the target wireless device:

broadcasting a Bluetooth advertisement beacon including an action type indicating a request to transfer cellular wireless service to the target wireless device;

receiving, from the source wireless device, a request to initiate a secure Bluetooth connection between the source wireless device and the target wireless device;

establishing the secure Bluetooth connection with the source wireless device after successful verification of the source wireless device via an authentication procedure;

receiving, from the source wireless device, a list of cellular wireless service plans available on the source wireless device;

when the list of cellular wireless service plans includes at least one cellular wireless service plan transferrable to the target wireless device:

sending, to the source wireless device, a plan transfer request to transfer a particular cellular wireless service plan associated with a subscriber identity module (SIM) or an electronic SIM (eSIM) of the source wireless device selected by the target wireless device from the list of cellular wireless service plans received from the source wireless device;

receiving, from the source wireless device, a plan transfer response that includes a transfer token associated with a new eSIM reserved for transfer of the particular cellular wireless service plan;

sending, to a mobile network operator (MNO) entitlement server, a cellular service transfer request including the transfer token for authentication;

receiving, from the MNO entitlement server, a cellular service transfer response that indicates approval to obtain the new eSIM; and downloading, from an MNO provisioning server, the new eSIM; and when the list of cellular wireless service plans does not include at least one cellular wireless service plan transferrable to the target wireless device: redirecting to an alternate eSIM provisioning procedure.

12. The method of claim 11, wherein the authentication procedure comprises:

by the target wireless device:

generating a random personal identification number (PIN) code;

sending, to the source wireless device, an authentication request;

receiving, from the source wireless device, an authentication response that includes a PIN code value; and validating the PIN code value matches the generated random PIN code.

13. The method of claim 11, wherein the authentication procedure comprises:

by the target wireless device:

generating a quick response (QR) verification code; and presenting the QR verification code via a display of the target wireless device for scanning by the source wireless device.

14. The method of claim 11, further comprising:

by the target wireless device:

installing and activating the new eSIM on an embedded integrated circuit card (eUICC) of the target wireless device;
sending, to the source wireless device, an indication that transfer of the particular cellular wireless service plan is complete; and
closing the secure Bluetooth connection with the source wireless device.

15. The method of claim 11, wherein the Bluetooth advertisement beacon includes a unique identifier for the source wireless device received from the source wireless device via an out-of-band communication channel other than the secure Bluetooth connection.

16. The method of claim 15, wherein the target wireless device obtains the unique identifier for the source wireless device from a cloud network service associated with the source wireless device and the target wireless device.

17. The method of claim 11, wherein the Bluetooth advertisement beacon includes a sequence number that increments or changes to a different value for distinct wireless service plan transfer sessions initiated by the target wireless device to request to transfer cellular wireless service to the target wireless device.

18. The method of claim 11, wherein the list of cellular wireless service plans includes for each cellular wireless service plan a phone number and an indication whether the cellular wireless service plan is transferable to the target wireless device.

19. The method of claim 11, wherein the Bluetooth advertisement beacon includes an authentication type indicating either a quick response (QR) code or a manual numeric or alphanumeric code is required for authentication.

20. A non-transitory computer-readable medium storing instructions to configure at least one processor of a target wireless device to transfer cellular wireless service from a source wireless device to the target wireless device by performing a method including:
broadcasting a Bluetooth advertisement beacon including an action type indicating a request to transfer cellular wireless service to the target wireless device;
receiving, from the source wireless device, a request to initiate a secure Bluetooth connection between the source wireless device and the target wireless device;
establishing the secure Bluetooth connection with the source wireless device after successful verification of the source wireless device via an authentication procedure;
receiving, from the source wireless device, a list of cellular wireless service plans available on the source wireless device;
when the list of cellular wireless service plans includes at least one cellular wireless service plan transferrable to the target wireless device:
sending, to the source wireless device, a plan transfer request to transfer a particular cellular wireless service plan associated with a subscriber identity module (SIM) or an electronic SIM (eSIM) of the source wireless device selected by the target wireless device from the list of cellular wireless service plans received from the source wireless device;
receiving, from the source wireless device, a plan transfer response that includes a transfer token associated with a new eSIM reserved for transfer of the particular cellular wireless service plan;
sending, to a mobile network operator (MNO) entitlement server, a cellular service transfer request including the transfer token for authentication;
receiving, from the MNO entitlement server, a cellular service transfer response that indicates approval to obtain the new eSIM; and
downloading, from an MNO provisioning server, the new eSIM; and
when the list of cellular wireless service plans does not include at least one cellular wireless service plan transferrable to the target wireless device:
redirecting to an alternate eSIM provisioning procedure.

* * * * *